United States Patent
Pennington et al.

(10) Patent No.: US 11,308,488 B2
(45) Date of Patent: Apr. 19, 2022

(54) DEVICE, METHOD, AND COMPUTER READABLE MEDIUM FOR LARGE SCALE ELECTRONIC PROCESSING

(71) Applicant: THE VANGUARD GROUP, INC., Valley Forge, PA (US)

(72) Inventors: Warren Pennington, New Castle, DE (US); John Evans, Downingtown, PA (US); Ryan Lovell, Wayne, PA (US)

(73) Assignee: THE VANGUARD GROUP, INC., Valley Forge, PA (US)

( * ) Notice: Subject to any disclaimer, the term of this patent is extended or adjusted under 35 U.S.C. 154(b) by 0 days.

(21) Appl. No.: 16/439,097

(22) Filed: Jun. 12, 2019

(65) Prior Publication Data

US 2019/0377724 A1    Dec. 12, 2019

Related U.S. Application Data

(60) Provisional application No. 62/683,976, filed on Jun. 12, 2018.

(51) Int. Cl.
*G06Q 20/38*    (2012.01)
*G06F 16/23*    (2019.01)

(52) U.S. Cl.
CPC ....... *G06Q 20/389* (2013.01); *G06F 16/2365* (2019.01); *G06F 16/2379* (2019.01); *G06Q 20/381* (2013.01)

(58) Field of Classification Search
CPC .. G06Q 20/065; G06Q 20/10; G06Q 2220/00; G06Q 50/01; G06Q 20/389;

(Continued)

(56) References Cited

U.S. PATENT DOCUMENTS 10,536,445 B1 * 1/2020 Lerner .................. H04L 9/3239
2008/0275810 A1 * 11/2008 Musier .................. G06Q 30/04
705/37

(Continued)

OTHER PUBLICATIONS

Warren Pennington, et al., "Blockchain-Enabled, Subscriber-Based Capital Markets Index Data Distribution", The Journal of Index Investing, 2017, pp. 83-87.

(Continued)

*Primary Examiner* — Alexander G Kalinowski
*Assistant Examiner* — Sanjeev Malhotra
(74) *Attorney, Agent, or Firm* — Oblon, McClelland, Maier & Neustadt, L.L.P.

(57) ABSTRACT

A system, method and computer-readable storage medium that add at least one transaction block to a chained sequence of one or more blocks, including receiving a request message having data of an electronic transaction, broadcasting, to nodes in a blockchain network, a consensus request message for generating at least one transaction block including creating a block header that contains a hash pointer to a previous block, and concurrently with updating transaction block data, comparing and performing an action based on the comparing, performing periodic valuation and transmission of an item having a value that is tied to the transaction data, including establishing transmission links with the external entities, determining a value of the item, and establishing movement of the item between the external entities based on the determined value of the item and predetermined thresholds.

13 Claims, 12 Drawing Sheets

(58) Field of Classification Search
CPC ... G06Q 20/381; G06F 21/64; H04L 2209/38; H04L 9/3239; H04L 9/3247; H04L 2209/56; H04L 9/0637; H04L 63/0428; H04L 9/3236; H04L 9/3297
USPC .......................................... 705/51, 300, 37
See application file for complete search history.

(56) References Cited

U.S. PATENT DOCUMENTS

| | | | |
|---|---|---|---|
| 2016/0027229 A1* | 1/2016 | Spanos | G07C 13/00 |
| | | | 705/51 |
| 2017/0085545 A1* | 3/2017 | Lohe | G06Q 20/065 |
| 2017/0085555 A1* | 3/2017 | Bisikalo | H04L 9/3236 |
| 2017/0103385 A1* | 4/2017 | Wilson, Jr. | G06Q 20/3678 |
| 2017/0236094 A1* | 8/2017 | Shah | G06Q 10/101 |
| | | | 705/300 |
| 2017/0264428 A1* | 9/2017 | Seger, II | G06F 16/13 |
| 2019/0253247 A1* | 8/2019 | Sika | H04L 9/3239 |

OTHER PUBLICATIONS

International Search Report and Written Opinion dated Aug. 28, 2019 in PCT/US19/36740, 18 pages.

\* cited by examiner

```
Control Logic
    Encoded Agreements
            Master Agreement                                          801
            CSA Agreement
            Settlement Instructions
            Custodial Agreement
            Bank Information
            Valuation thresholds
            Price sources
    Logic
            MTM valuations at programmable frequency
            collateral measurement
            collateral movement
            confirmation processing
            currency forward exchange rate calculation
            receive market updates (interest rates, pricing)
```

```
Block (Participant 1 Pending Transaction)
        trade direction                                                803
        currency pair
        trade date
        time of execution
        notional amount
        rates: spot rate, first currency interest, second currency interest
        settlement date, contract period
```

```
Block (Other Participant(s) Accepted Transaction)
        trade direction                                                805
        currency pair
        rates: spot rate, first currency interest, second currency interest
        settlement date, contract period
```

```
Block (Executed Contract Transaction)
        forward current contract                                       807
        authorized banks
```

FIG. 8

DEVICE, METHOD, AND COMPUTER READABLE MEDIUM FOR LARGE SCALE ELECTRONIC PROCESSING

CROSS-REFERENCE TO RELATED APPLICATIONS

This application claims the benefit of priority to provisional application No. 62/683,976 filed Jun. 12, 2018, the entire contents of which are incorporated herein by reference.

BACKGROUND

Technical Field

The present disclosure is directed to large scale electronic processing, in particular distributed ledger technology that utilizes coordination among multiple concurrent processes.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A distributed ledger is a transaction database shared by nodes participating in a distributed system. The term nodes as it relates to distributed ledger technology means independent computer entities that store a full copy of the ledger, is capable of executing a consensus algorithm, and may execute control logic associated with management of the distributed ledger. Each node may be computer system, ranging from a laptop computer to a workstation to a virtual server in a data center. Depending on required computing resources, a computer system serving as a node may be equipped with, or have access to, powerful graphics processing units (GPUs). When a particular node receives a transaction request, it broadcasts the transaction request to the other nodes in the network. Subsequently, a full copy of a distributed ledger contains every transaction ever executed.

SUMMARY

The present disclosure relates to a device, method, and computer-readable medium for a device in a blockchain network that communicates over a computer network with a first external computer terminal, one or more second external computer terminals, and at least two external entities. The device includes a memory configured to maintain data of an electronic transaction, predetermined thresholds, and external identification information; and circuitry. The method includes adding, by the circuitry, at least one transaction block to a chained sequence of one or more blocks, including receiving, over the computer network from the first external computer terminal, a request message having the data of the electronic transaction, broadcasting, over the computer network to the one or more second external computer terminals, an alert message alerting of the request message, receiving, over the computer network from the one of the one or more second external computer terminals, a response message having counter transaction data that relates to the alert message, determining a match between the transaction data and the counter transaction data, broadcasting, to a plurality of nodes in the blockchain network, a consensus request message for generating the at least one transaction block as an immutable record of the transaction data and the counter transaction data, the generating the at least one transaction block includes creating a block header that contains a hash pointer that has a hash of a block header of a block that the at least one transaction block is linked to, receiving, from one of the plurality of nodes, a message indicating that consensus has been achieved, and adding the at least one transaction block to the chained sequence, updating the data of the electronic transaction and comparing the data to the predetermined thresholds to obtain a comparison result, and performing an action based on the comparison result; and concurrently with the updating, comparing and performing an action, performing, by the circuitry, periodic valuation and transmission of an item having value that is tied to the transaction data, including transmitting messages to the external entities associated with the external identification information, establishing transmission links with the external entities, determining a value of the item, and establishing movement of the item between the external entities based on the determined value of the item and the predetermined thresholds.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 8 is a diagram of a blockchain having control logic, in accordance with an exemplary aspect of the disclosure;

DETAILED DESCRIPTION

Figure 1:
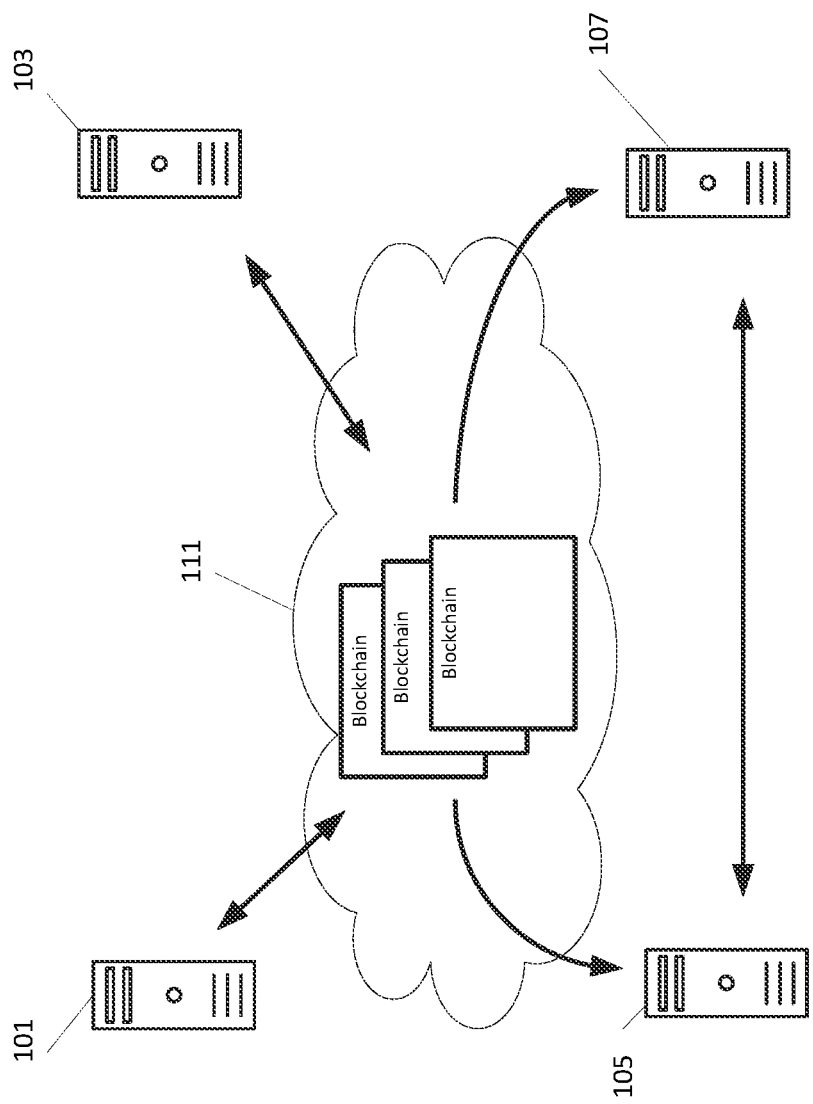
FIG. 1 is a block diagram a blockchain network.

In the drawings, like reference numerals designate identical or corresponding parts throughout the several views. The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

Referring now to the drawings, the following description relates to a blockchain system and method that integrates the creation of contracts for currency forwards with collateral valuation and management. Specifically, a common computer system-based blockchain-implemented distributed ledger serves as the official shared platform for recordkeeping and automation of bi-lateral FX forward contracts including key risk mitigation provisions of ISDA and CSA agreements. This common computer system-based ledger is distributed, and embeds highly trusted record keeping and automation capabilities. The automation of forward contracts includes synchronizing the core ongoing valuation and related collateral movement mechanism through the ledger's smart contract. Using this automation, the currency forward contract execution is linked with the price-volatility-induced counterparty exposures, bringing counterparty risk to within mutually acceptable tolerances and containing intraday exposures. The system and method are implemented as a permission-based network of nodes and an associated consensus strategy to support transaction frequency and volume.

Blockchains are distributed ledgers where data is structured in blocks. When new data is added, new blocks are created, forming a chain of blocks. Every block in a blockchain contains a hash of the previous block. A hash function that is used to generate a hash for a blockchain is typically SHA-256 or Keccak-256. Blocks may also include a timestamp and a hashed entry. The chain of blocks is such that each block is guaranteed to come after a previous block chronologically because the previous block's hash would otherwise not be known. Each block is also computationally impractical to modify. Thus, the distributed system generally is both a chain of blocks and a distribution of the chained blocks in a computer network.

FIG. 1 is a block diagram illustrating a general blockchain system. A blockchain system provides an immutable ledger through a consensus algorithm. A consensus algorithm is an algorithm performed by the nodes and consensus is achieved when a majority of the nodes agree, There are many types of consensus algorithms in a blockchain system: two of the most common types on public blockchain networks are Proof-of-Work and Proof-of-Stake. Other blockchain approaches have been and are continuing to evolve, including different approaches employed in private blockchain instances, such as Byzantine Fault Tolerant Smart (BFT-SMaRt). The Proof-of-Work algorithm is used to achieve a consensus in order to add new blocks to the chain. In Proof-of-Work, miners compete against each other to arrange blocks. In practice, miners solve a complicated mathematical puzzle such as a hash function to determine a hash. The Proof-of-Stake algorithm is also used to add new blocks to the chain. The other consensus algorithm, Proof-of-Stake, does not use mining, and instead the creator of the next block is chosen by various combinations of random selection, wealth or entity age, such as a coin age, which is the stake. The consensus algorithm typically includes a process of arranging the data for the new block.

In the example blockchain system shown in FIG. 1, nodes, including two trading entities, or counterparties 101, 103, and other participants 105, 107 interact with a blockchain (via the blockchain system) maintained using a computer network 111. In this disclosure, the terms counterparty and party may refer to trading entity participants. The computer network 111 interconnects the distributed system of nodes that stores and executes the blockchain. Each participant may be facilitated by one or more computer systems that are connected to the computer network 111.

A foreign exchange (FX) forward contract, or currency forward contract, is an agreement between two parties to exchange two designated currencies at a specified time in the future. These contracts take place on a date after the date that a spot contract settles, where a spot contract is a contract for buying or selling the currency for immediate settlement on a spot date, typically two days forward for the currency pair traded. In some cases, a foreign exchange contract is an agreement under which a business agrees to buy a certain amount of foreign currency on a specific future date. The purchase may be made at a predetermined exchange rate. By entering into this contract, the buyer can protect itself from subsequent fluctuations in a foreign currency's exchange rate. Thus, timing is a critical component in foreign exchange forward contracts.

Examples of major pairs of currencies include the U.S. dollar and euros; the U.S. dollar and Japanese yen; the U.S. dollar and the British pound sterling; and the U.S. dollar and the Swiss franc. Other pairs of currencies may be used in a foreign exchange contract, such as the U.S. dollar and the Canadian dollar. Exchange rates for currency pairs can be obtained for up to 12 months, but in some cases may be obtained for up to 10 years. Also, minimum contract amounts are typically over $30,000.

A forward exchange market is an over-the-counter (OTC) marketplace for contracts that ensure the future delivery of a foreign currency at a specified exchange rate. Thus, a forward market leads to the creation of forward contracts.

Forward exchange contracts can be customized to fit a customer's requirements and are generally executed between banks or between a bank and a customer.

Figure 2:
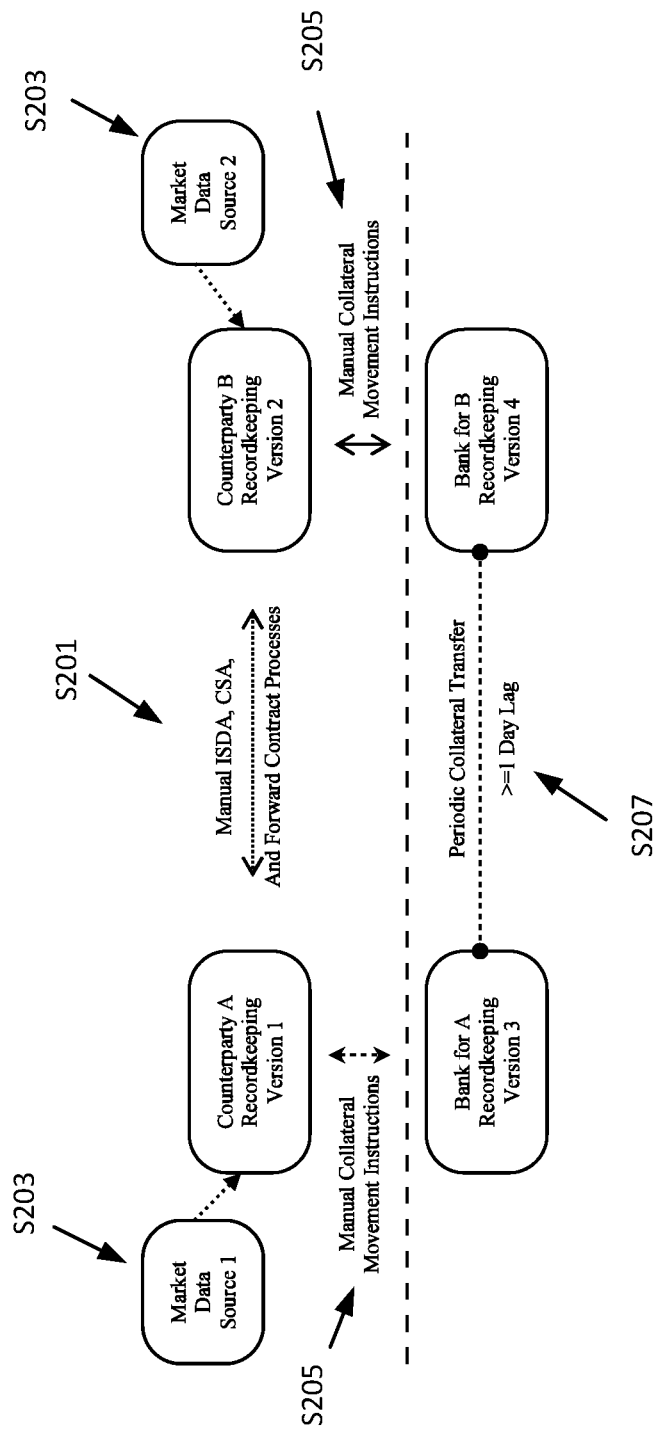
FIG. 2 is a diagram for a process for a new contract execution.

Currently, markets for managing the entire lifecycle of Foreign Exchange (FX) forward contracts are fundamentally disconnected. There is no common infrastructure between market participants executing currency forward contracts, and there is no infrastructure linkage between associated parties to each transaction. Associated parties typically consist of the trading entities (each of the two parties entering the contract) and their associated banks (the parties implementing collateral movement and final settlement to contain counterparty exposure between trading entities). FIG. 2 illustrates an example process between trading entities and associated banks to carry out a new contract execution.

In S201, contracts are entered into on Day 0, and are revalued at the end of each trading day. In S203, on Day 1 the valuations from the close on Day 0 are reviewed against prescribed limits and pricing methodologies, and, in S205, collateral movement instructions are agreed-upon and initiated. By Day 2, in many cases, in S207 collateral movements subject to minimum transfer amounts (MTA) from the end-of-Day 0 valuation are complete, by which time the exposure has changed in response to two days of currency volatility. In some cases, due to various circumstances including alternative pricing sources, disputes over results of calculations, or simply processing mistakes, by Day 2 collateral still doesn't move and the exposure grows until collateral finally is moved to reflect currency volatility. This time and processing disconnect may be magnified across millions of positions and hundreds of billions of USD equivalent notional contracts.

In addition, FX contracts and collateral management operation are typically executed using manual procedures. For each forward contract, one or more International Swaps and Derivatives Association (ISDA) agreements including Credit Support Annexes (CSAs) must be in place, one per counterparty pairing. Since most market participants operate using manual processes and rely on manual interactions between counterparties, the different risk profile, higher frequency but lower severity exposures, is particularly problematic.

In particular, collateral management involves setting forth requirements for collateral in a credit support annex included within the ISDA agreement. Collateral needed for credit support is then monitored daily. Collateral amounts must be sufficient as outlined in the CSA before a trade can be completed. Collateral can often take many forms with the most common being cash or securities. Requirements for collateral levels must constantly be monitored in order to ensure that adequate collateral is held per OTC derivative trading value.

Also, collateral management processes must be built between each counterparty bank, with collateral movement instructions and collateral monitoring being carried out separate from a FX contract execution and monitoring processes. Collateral management systems have been built, but these systems are not typically connected between counterparties, and integrating collateral management into larger treasury or portfolio management tools has not been accomplished.

Further, FX contracts are negotiated, and manually recorded. The terms and conditions of each component of these agreements must then be monitored, primarily using manual processes. Each trade is entered into record keeping systems that are not connected between participants. Participants record keeping systems each have valuation calculations often based on disparate pricing sources and custom-built risk monitoring systems that are often created by individual analysts using, for example, Excel.

Thus, for each FX contract, there typically are a minimum of four associated participants (two trading entities, each with their own associated banks), and each participant has in place perhaps four different systems or tools (one for managing ISDA/CSA's, one for managing the currency forward contracts, one for managing collateral, and one for managing the underlying portfolios or assets). Furthermore, there is no common source of truth amongst these participants, and discrepancies or disagreements are common.

Figure 3:
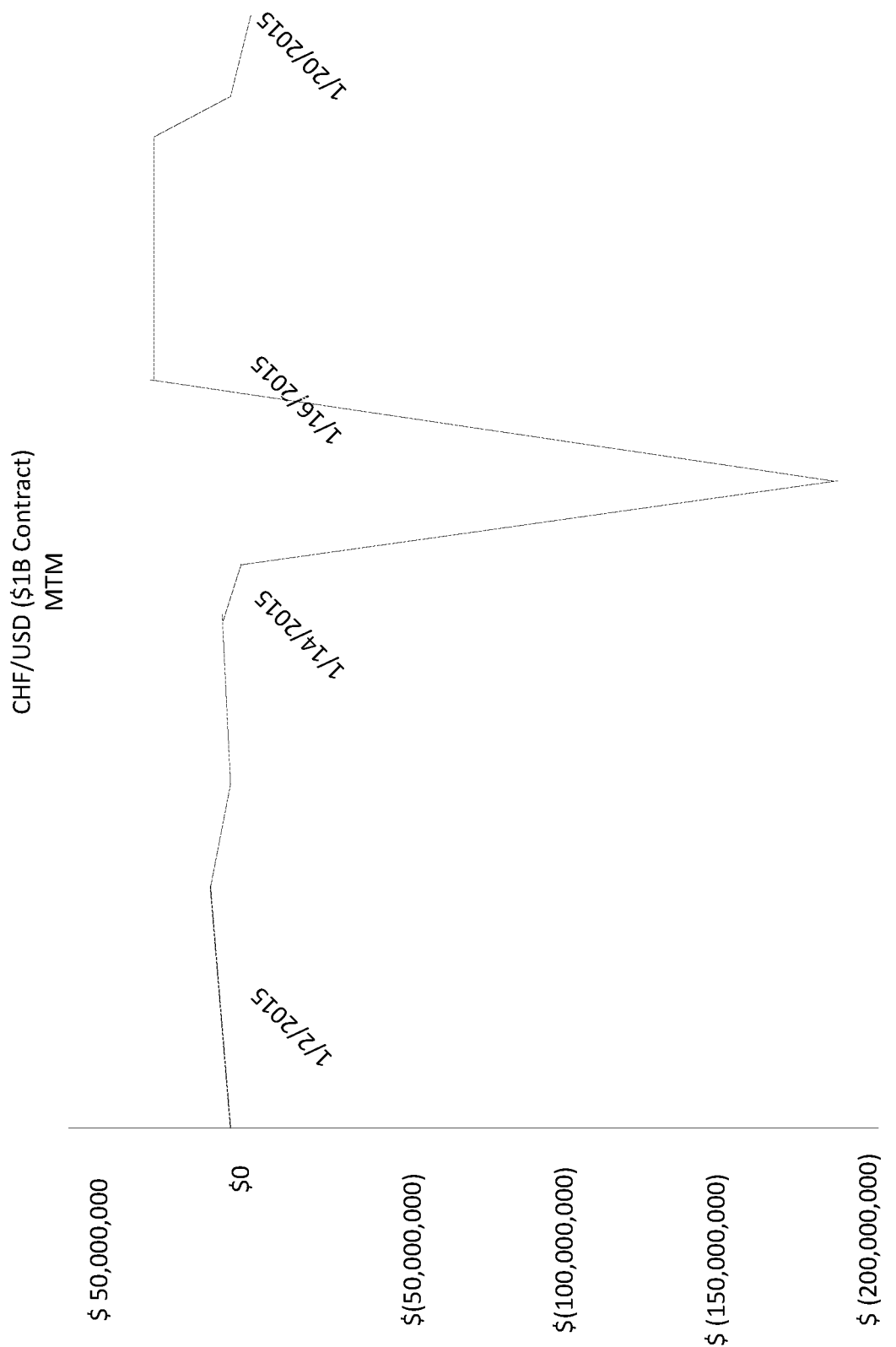
FIG. 3 is a graph for an exemplary counterparty exposure for a USD/EUR forward contract.

An example of the disconnected and disjointed nature of the FX forward contract markets, on Sep. 16, 2016, after the close of business on the New York Stock Exchange (NYSE), news broke that the US Government was in talks with Deutsche Bank about a potential $14 Billion settlement stemming from the days of the financial crisis. See Reuters, "Deutsche Bank Says DoJ Wants It to Pay $14 Billion to Settle Mortgage Case", fortune.com, Sep. 16, 2016, incorporated herein by reference in its entirety. That amount nearly tripled the entire loss reserves the Bank had previously reported for all of its litigation globally, and would have severely stressed the Bank's regulatory capital reserves. The Bank would be forced to raise additional capital, putting more pressure on its plummeting stock price. With equity representing a significant portion of the Bank's capital, firms that had placed trades with Deutsche Bank earlier that Friday were concerned about potentially being exposed to a total loss due to currency valuation moves over the weekend, induced by the Deutsche Bank news and the remote potential of a bankruptcy. Thanks to the disconnected and disjointed nature of the FX forward contract markets globally, Friday decisions were waiting for Monday collateral movement processes to close out counterparty risk. In the 2008 Lehman scenario (see Davidson article), Monday never came. FIG. 3 is a graph for an example Counterparty Exposure for USD/EUR Forward Contract ($5 Billion USD Notional, 30-day Forward Contract, Month of September, 2016).

The nature of over-the-counter (OTC) markets allows flexibility and customization. OTC markets encourage and enable innovation in structuring trades. OTC markets can also structurally avoid highly concentrated exposures and systemic risk from the failure of any single component of the market, with some notable and disastrous exceptions, for example consider AIG in the OTC Credit Default Swaps (CDS) markets. See Davidson, A., "How AIG Fell Apart", reuters.com, Sep. 18, 2008, incorporated herein by reference in its entirety. OTC markets enable the participation of a vast array of market participant counterparties. Some counterparties have a high enough risk tolerance to operate without Credit Support Annexes (CSAs) or collateral protections (e.g. certain hedge funds). Some counterparties are required by regulation to avoid and contain counterparty risk for every trade (e.g. US Mutual Funds and UCITS Funds).

In the context of mutual funds, legal structures around collateral transfer differ globally. US Mutual Funds need to operate with a tri-party arrangement. For each mutual fund a segregated account held by the fund's custodian must be created for each counterparty, and collateral is moved between the fund's custody account back and forth to the custodian's tri-party account. The fund still has legal ownership of its own assets transferred into the tri-party account. A different situation exists for Australian mutual funds. There, funds transfer collateral back and forth between counterparty bank accounts. Legal transfer of ownership of the collateral occurs with each movement.

On the other hand, the gap between the currency forward contract execution and monitoring, and the collateral management process associated with each contract is a consistent problem. This structural risk adds an overall tax onto the global capital markets by increasing the costs associated with hedging or betting on currency pair movements in the OTC forward market. It also reduces liquidity across the market since trading counterparties are necessarily limited to those with adequate legal, capital, and operational capabilities to handle the residual counterparty default exposures that result from the disconnected market operations.

In this disclosure, a financial exposure is an amount an investor stands to lose in an investment. In order to address exposures that occur in the FX forward contract market, one option has been for counterparties to quickly negotiate new trades to replace and cover the counterparty exposures. The remaining market participants, being well aware of the exposures, and also potentially having been caught exposed to those same stressed counterparties, have to adjust their risk accordingly, and the cost to novate positions rises. This additional cost overhead on the markets pulls capital away from more efficient uses, and reduces both the risk (shifting to a new counterparty that presents a lower risk of defaulting) and return to investors globally (due to higher costs incurred).

It is one object of the present disclosure to provide a market infrastructure that enhances the foreign exchange (FX) forward contract market by a distributed ledger technology (DLT) that coordinates among multiple concurrent processes including the creation of collateral-linked contracts for currency forwards and collateral valuation and movement. Other objectives include adding a common ledger in a shared platform to perform the recordkeeping and automation of bi-lateral FX forward contracts including key risk mitigation provisions of ISDA and CSA agreements. The automation may include a computer network system that synchronizes the ongoing valuation and related collateral movement mechanism through the ledger's smart contract layer. In some aspects, the essential benefits of the over-the-counter (OTC) market structure are preserved since collateral-linked contracts for currency forwards remain bi-lateral agreements subject to ISDA and CSA constraints, while continuing to allow for electronically customized terms and conditions between market participants. Additional benefits of OTC markets in the form of reduced concentration risk are also preserved, since there is no central counterparty or central clearing organization into which all risks are pooled. As a result, real time contract transactions performed in coordination and concurrently with collateral valuation and management enables enhanced liquidity and reduced risk in the FX forward contract market, allowing for new economics and interactions to support both the hedging and speculation of currency exposures across a wide range of market participants, including institutional funds, pension plans, corporate treasuries, banks, and insurers.

The distributed ledger technology that integrates the creation of contracts for currency forwards with collateral valuation and management is applicable as well to other types of trades that involve collateral. In particular, the distributed ledger technology may also incorporate securities lending. Securities lending requires the borrower to put up collateral, including cash, security or a letter of credit. When a security is loaned, the title and the ownership are transferred to the borrower for a specified period of time.

The distributed ledger technology of the present disclosure may also be applied to Exchange Traded Fund (ETF). ETF shares traded on exchange in the secondary market are created and redeemed in the primary market directly with ETF fund managers. The process of creating and redeeming ETF share is handled in bulk, through the trading of baskets of ETF shares. Collateral coverage is adjusted based on the valuation volatility of both the basket and the underlying collateral.

The distributed ledger technology of the present disclosure may also incorporate repurchase agreements. In repurchase agreements, the party selling the security enters into an agreement to repurchase it in the future, which is a short term. The security is collateral.

Further, the distributed ledger technology of the present disclosure may also incorporate futures contracts. A buyer of a futures contract takes on an obligation to buy an asset or commodity when the futures contract expires. The seller of the futures contract takes on the obligation to provide the underlying asset at the expiration date.

Figure 4:
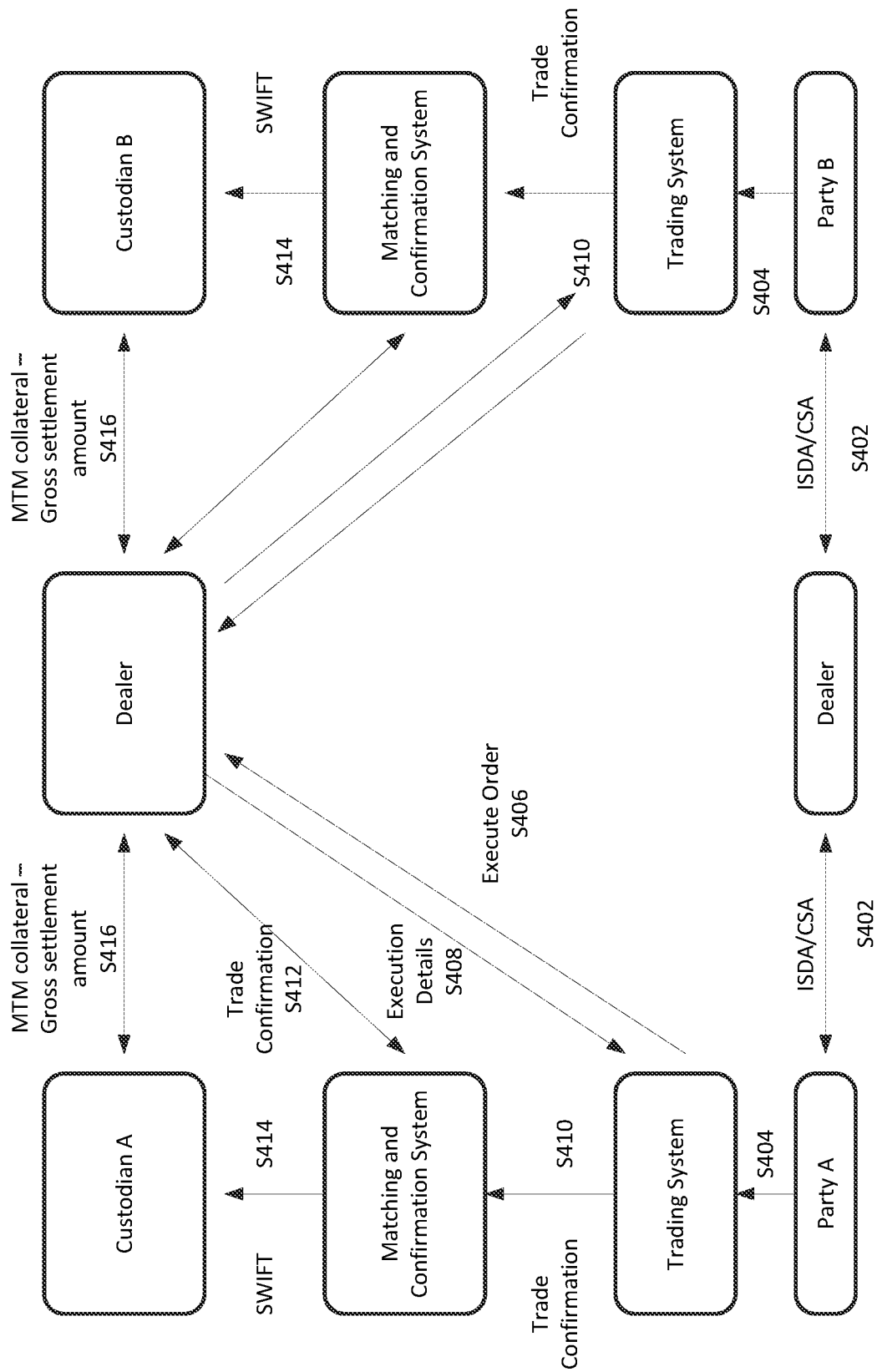
FIG. 4 is a diagram for an exemplary foreign exchange forward contract process.

In order to explain embodiments of the present disclosure, the FX forward contract lifecycle, from pre-trade activities through settlement and accounting will be described. More details of the FX forward contract process can be found in, New York Federal Reserve; The Foreign Exchange Committee. Foreign Exchange Transactions: Execution to Settlement Recommendations for Non-Dealer Participants, January 2016, incorporated herein by reference in its entirety. The FX process flow may be considered in terms of six phases: 1) pre-trade preparation and documentation; 2) trade execution and capture; 3) confirmation; 4) netting and settlement; 5) account and portfolio reconciliation; and 6) accounting/financial control processes. FIG. 4 is a diagram for a typical foreign exchange (FX) forward contract process.

The pre-trade preparation and documentation phase initiates the business relationship between two parties. In S402, the pre-trade preparation and documentation phase involves putting into place proper pre-trade documentation. In particular, ISDA and CSA Master agreements are put in place between a Participant Party A and a Participant Party B. These Master Agreements contain terms that will apply to transactions, including expressions of market practice and convention, and terms for netting, termination, collateral management and liquidation. A third-party custodial agreement is put in place between Custodian A and Party A. In this disclosure, a Custodian may be a bank or other institution that may hold assets or property serving as collateral. In this disclosure, the terms custodian and bank are used interchangeably. Custodial Agreements contain terms that outline an arrangement whereby an institution acting as a custodian holds the assets or property, and performs other agreed-upon services, on behalf of the actual owner.

The process continues with order management. FX transactions may be executed through voice or on an electric platform. Information captured for FX transactions typically includes trade date, time of execution, settlement date, counterparty, financial instrument traded, amount transacted, and price or rate. In S404, a Participant Party A generates an FX order. Details about the currency pair are generated and captured in an appropriate Trading System. For example, a front-end system that captures transaction information may interface with other systems that monitor and update trade related activity. In S406, the Trading System sources quotes from approved Dealers (ISDA agreement) and an FX forward contract is identified. In S408, execution details are sent back to the Trading System. In S410, once the execution details are confirmed in the Trading System, a confirmation is sent to the Matching and Confirmation System that enriches the trade details. Transaction confirmation provides evidence of the terms of an FX transaction. Confirmation may be conducted by counterparties generally exchanging or matching electronic or paper confirmations that identify the transaction details and provide other relevant information. Each of these processes may be done manually, electronically, or through some combination of both manual and electronic means. There is no single set of infrastructure or systems that connects market participants and allows the sharing of data or trade details.

The process continues with a Post-Trade stage. In S412, the Matching and Confirmation System collects trade details from the Trading System and the final matching process is completed. Settlement is the making of payments or exchange of payments between counterparties on a FX's transaction's settlement date. In S414, the Matching and Confirmation System sends settlement/trade instructions to both Custodian A and Custodian B.

Account reconciliation occurs at the end of the trade settlement process to ensure that a trade has settled properly and that all expected cash flows occur. Thus, in S416, Custodians perform daily mark-to-market (MTM) valuations of collateral. If MTM is negative, Participant Party A is out of the money and must pledge collateral to the Participant Party B in a segregated account at Custodian A (tri-party agreement). If MTM is positive, Participant Party A is in the money and the Participant Party B must pledge collateral to cover their exposure by writing proceeds to Custodian A. A Custodian performs settlement. On settlement date the gross amounts of each counter currency will be delivered based upon the forward exchange rate on the trade date. The forward exchange rate for a currency pair is fixed and specified for a specific date in the future.

Figure 5:
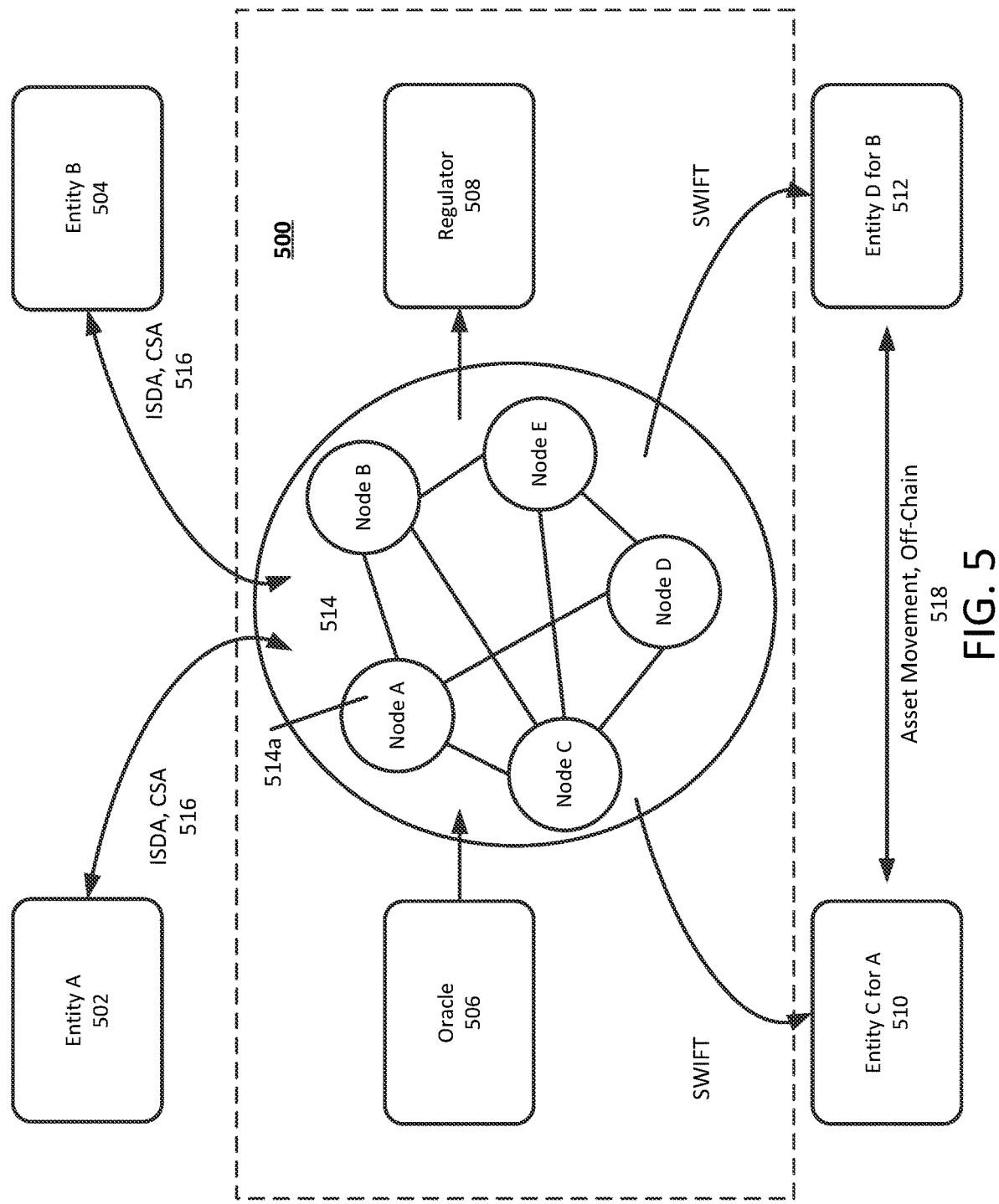
FIG. 5 is a diagram for a system implemented using a blockchain network, in accordance with exemplary aspects of the disclosure.

FIG. 5 is a block diagram for a system for a collateral-linked contract for currency forwards market. The structure and implementation are based on Distributed Ledger Technology (DLT) 500. The blockchain network 514 is a computer system of communicating independent nodes, for example Node A to Node E. Each node stores a copy of a blockchain, and is configured to perform a consensus algorithm and to update the blockchain. As mentioned above, a blockchain is an ordered set of linked blocks, linked by cryptographic signatures. In some embodiments, the blockchain is a set of linked blocks in which each block contains a hash pointer, which includes an address of a previous block and a hash of the block header of the previous block. Each block header includes a hash of a previous block. Thus, a block header in a newly added block will include a hash that essentially is a hash of all linked block headers in a blockchain. The full copies of the blockchain are maintained in the nodes 514a of a blockchain network 514. One or more head blocks of the blockchain include control logic, often referred to as a smart contract, which includes computer program logic that when executed by a node 514a controls aspects such as the agreements between parties, valuation and collateral movement. As shown in FIG. 5, trading entities 502, 504 can join the blockchain network 514. In some embodiments, joining a blockchain network 514 may include obtaining authentication in order to gain access to the blockchain for purposes of initiating transactions. The proper ISDA and CSA agreements may be prepared and recorded 516, in particular, stored in the blockchain network 514 as part of the control logic. In some embodiments, CSA agreements may be stored as complete documents, such as PDF documents, HTML markup, or may separate the agreement into legal text and extracted data. In disclosed embodiments, data extracted from an agreement may include any values for particular attributes. As a non-limiting example, data that is extracted from a CSA agreement may include values for the attributes "base currency", "covered transactions," "exposure", "credit support obligations", "valuation", "timing", to name a few.

An oracle 506 is a computer system that is agreed upon prior to executing any contracts. The role of the oracle 506 may include to provide the agreed upon market data inputs used by the trading entities to operate the ongoing calculations and exposures. Examples of market data inputs include currency exchange rates, interest rate, and security prices. In some embodiments, the oracle 506 is a computer server that calls the control logic being executed in a node when certain conditions are met. The oracle 506 may monitor price of a currency and interest rates. A regulator 508 may be a computer system that also has access to the blockchain network 514 to monitor transactions on the network. For example, the regulator 508 may be granted visibility into the underlying transactions (i.e., for transaction reporting, reviewing market activity), in response to Markets in Financial Instruments Directive (MIFID) II or other regulatory initiatives. Entities C and D 510, 512 may be bank computer systems, or other asset custodian computer systems, that remain as separate entities and do not need to join the blockchain network 514, so long as an appropriate asset instruction message 518 can be received and processed from the network by each entity. In such case, asset movement may be performed off chain. Once an entity 510, 512 joins the blockchain network 514, asset movement can be monitored and controlled by execution of the control logic on a node and recorded in the control logic via the blockchain network 514 directly (on chain).

Figure 6:
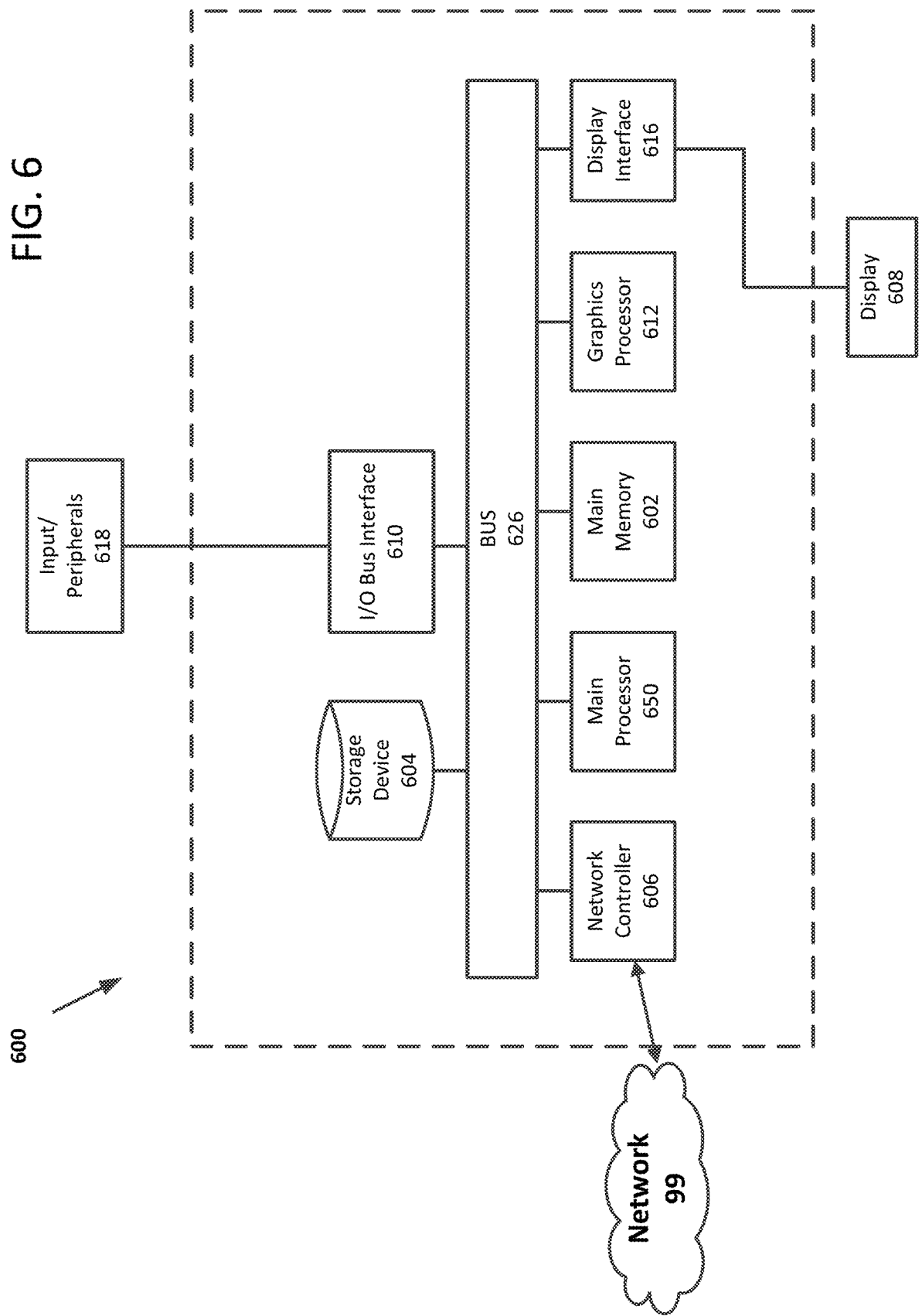
FIG. 6 is a block diagram of a computer system, in accordance with exemplary aspects of the disclosure.

FIG. 6 is a block diagram illustrating an example computer system for implementing the distributed ledger technology according to an exemplary aspect of the disclosure. The distributed ledger technology may be implemented as browser-based user interfaces that are executed on networked desktop computers, laptop computers, tablet computers, or the like, running any of well-known operating systems, including a version of the Windows Operating System, Macintosh Operating system, Android Operating System, iOS, or a Linux-based computer system. The distributed network on which the distributed ledger technology is maintained, may include a network of nodes 514a, each node 514a of which may be a computer system of FIG. 6. In this disclosure, a node 514a may be implemented as software executed by processors 650, as a computer image in a cloud service, virtual processors, any of various application specific integrated circuits, or integrated logic circuits, collectively referred to herein as circuitry 600. Connections and communications between end user computers and the nodes 514a are accomplished using the Internet, which may be either IPv4 or IPv6.

A computer system (circuitry 600) may include one or more main processors 650 and may include a graphics processing device 612. The graphics processing device 612 may perform many of the mathematical operations of the distributed ledger technology. In order to achieve the distributed ledger technology, the main processors 650 and other hardware elements may be realized by various processing circuitry, known to those skilled in the art. For example, CPU 650 may be a Xenon® or Core® processor from Intel Corporation of America or an Opteron® processor from AMD of America, or may be other processor types that would be recognized by one of ordinary skill in the art.

The computer system (circuitry 600) may include a main memory 602 that contains the software being executed by the processors 650 and 612, as well as a long term storage device 604 for storing blockchain-related data and blockchain-related software programs including control logic, one or more consensus algorithms, and one or more hash functions.

Several interfaces for interacting with the computer system (circuitry 600) may be provided, including an I/O Bus Interface 610, Input/Peripherals 618 such as a keyboard, touch pad, mouse, Display Interface 616 and one or more Displays 608, and a Network Controller 606 to enable wired or wireless communication through a network 99. The interfaces, memory and processors may communicate over the system bus 626, such as a PCI bus.

In the DLT 500, a trading entity 502, 504 may enter an order request into a terminal computer, which packages the order information into a digital token. The digital token constitutes initiation of a transaction. The initial transaction is passed to the DLT 500 for performance of a consensus algorithm, arrangement into a block and linking the block into the chain of a decentralized ledger. The arrangement of a transaction into a block is handled by a consensus algorithm, such as Proof-of-Work or Proof-of-Stake or other problem that is difficult to solve, but simple to prove.

Figure 7:
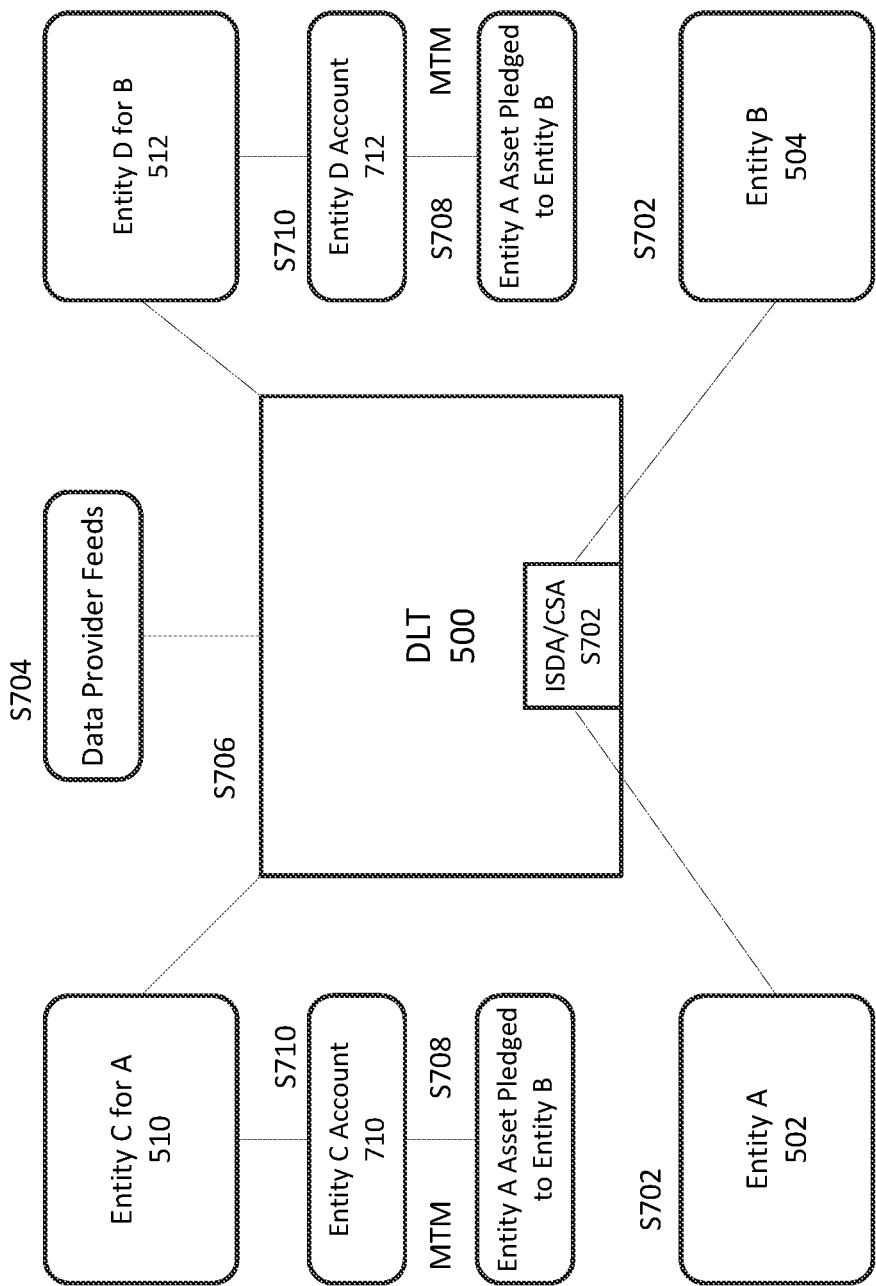
FIG. 7 is a block diagram for a foreign exchange forward contract process implemented using distributed ledger technology, in accordance with exemplary aspects of the disclosure.

FIG. 7 is a block diagram for a process implemented using distributed ledger technology, in accordance with exemplary aspects of the disclosure. FIG. 8 is a diagram of a blockchain having control logic, in accordance with an exemplary aspect of the disclosure. FIG. 7 illustrates differences over the FX forward contract process of FIG. 4. Participants, including Entity C 510 (Custodian A), Entity D 512 (Custodian B), Entity A 502, and Entity B 504 may be implemented using browser-based user interfaces or application programming interface (API) data feeds that may be executed on any of a number of different classes of computers operating as computer terminals, ranging from smartphones, tablet computers, to laptop and desktop computer systems. A minimum requirement of trading entity end-user computer is a processor and associated memory, a display and a network communications device for access to the Internet. As in FIG. 1, the Distributed Ledger Technology (DLT) may include networked computer systems 111 that operate as nodes 514a participating in the blockchain network 514.

Unlike the largely manual, process for carrying out a foreign exchange forward transaction as in FIG. 4, once initial agreements are in order between counterparties, the circuitry 600 may encode in the control logic 801 the agreements and automate subsequent processing steps including ongoing valuation and limit monitoring. In disclosed embodiments, control logic 801 may include data and computer program logic. The data portion may include, but is not limited to, links to legal documents, such as a portion of a Master Agreement, CSA Agreement, Settlement instructions, custodial agreement, bank information, valuation thresholds, and price thresholds. In some embodiments, data portions of the Master Agreement, CSA agreement and custodial agreement may be stored in a data structure such as XML, JSON, or HTML markup. The computer program logic portion of the control logic 801 may be in the form of functions in a programming language, including but not limited to general languages such as Javascript or Python, or special purpose programming languages for smart contracts such as Solidity, Serpent, and LLL. The computer program logic portion may include event declarations. In some embodiments, program logic such as collateral measurement, collateral movement, market updates may be implemented as event declarations, in which upon occurrence of the declared event, an action will be performed. MTM valuations and currency forward exchange rate calculation may be implemented in accordance with industry standard valuation practices. For example, the forward rate may be calculated as follows:

$$\text{forward rate} = S \times (1 + r(d) \times (t/360))/(1 + r(f) \times (t/360))$$

where S is the current spot rate of a currency pair, r(d) is the domestic currency interest rate, r(f) is the foreign currency interest rate, t is the time of the contract in days.

Using the DLT 500, as transactions are posted to the blockchain, a consensus algorithm is performed, for example a Proof-of-Work problem, and when consensus is achieved transactions are listed in a block and added to the chain, beginning with a link to the control logic 801. In some embodiments, the consensus algorithm is performed by all nodes 514a in the blockchain network 514. In some embodiments, the consensus algorithm is performed by one or more selected nodes 514a in the blockchain network 514.

The control logic 801, when executed by a node 514a in the blockchain network 514, provides a data structure for integrating currency forward contracts and collateral measurement and movement. The control logic 801 may be a single data block in the blockchain, but in disclosed embodiments may instead be organized and stored into several blocks. For example, the control logic 801 may include one block for handling initial currency forward agreements, including associated data and computer program logic, and another block for handling asset measurement and movement, including associated data and computer program logic. In some embodiments, the types of transactions that may be listed in blocks of the distributed ledger include a pending transaction 803, an accepted transaction 805 and an executed contract transaction 807. Data that may be posted in a block for a pending transaction 803 may include a trade direction, a currency pair, a trade date, a time of execution, a notional amount, various rates such as a spot rate, currency interest rates, a settlement date, and contract period. In some embodiments, each type of transaction may include a transaction ID and time stamp. In some embodiments, some transaction data may include bank data received in a later stage of creating a currency forward contract.

In the DLT 500, accounts, such as counterparty bank accounts, may be linked either directly using the blockchain networked computers 514 or via instructions generated by executing control logic 801 from the blockchain networked computers regarding movement of assets, thereby allowing a foreign exchange forward transaction to be performed in real time. Subsequently, the DLT 500 provides an advantage of eliminating a middle man, such as a dealer, since any potential trading entity can directly access the blockchain networked computers 514.

Regarding FIG. 7, in S702, pre-trade documentation is put in place. Settlement instructions, custodial agreements, master agreements, and guidelines for ISDA and CSA agreements may be entered electronically via a computer user interface into the control logic 801 of a distributed ledger (in a node 514a of the blockchain network 514). In some embodiments, at least portions of the instructions, agreements, and guidelines may be coded into special data structures and computer program logic, such as functions and event declarations. For example, an event declaration may be entered into the control logic 801 such that, when the event is initiated by a trading entity, the circuitry 600 of a receiving node will perform actions in accordance with the guidelines and standards agreed upon. In some embodiments, control logic 801 is computer code containing terms of transactions and/or terms of a corresponding ISDA/CSA. These terms may include, but are not limited to, definitions of calculations to perform MTM valuations on a programmable frequency using records stored on the blockchain and ingesting external inputs through data provider feeds including pricing data.

For example, in one embodiment, ISDA/CSA terms are stored in memory of a node in blocks as an HTML document with associated variables input and agreed to by parties as updates to the state of the blockchain as follows:

Legal Document HTML Template
    Convert a traditional legal document template into HTML format off network.
    Make the negotiable terms of the legal template into descriptive variables in the template (e.g. Paragraph 13 of a Credit Support Annex).
    Variable names will be contained within {{curly braces}} which will be used at a later time and be replaced with business terms and viewable in the finalized document.
    Upload and store the HTML legal document to the blockchain via a node of the blockchain network 514.

Legal Document Creation
    Initiating entity begins the process by selecting a Legal Document HTML Template stored in the blockchain.
    The entity selects business terms to apply to the Legal Document from a predetermined set of options including the counterparty signee of the document that is a participant of a computer network.
    The Counterparty is provided with the ability to render the proposed legal document with business terms in any HTML viewable platform.
    Counterparty can approve or modify business terms, updating the state of the document on the blockchain.
    Once approved, signer and signee of the legal document finalize the document which can be referenced with transactions on the blockchain.

The control logic 801 code can include comparison with minimum and maximum thresholds in order to support partial or full automation of processes related to asset measurement and asset movement.

Order management may be facilitated by the distributed ledger technology. In S704, Data Provider feeds received from external sources can be integrated into the distributed ledger (in a node of the blockchain network 514) to receive real-time market updates for interest rates, pricing data, and currency forward point calculations as inputs to various stages of the process. In S706, the circuitry 600 will capture data points of the desired transaction to facilitate a forward contract. In an exemplary embodiment, a user interface is provided for each entity participating in the blockchain network 514 and is used to electronically input all data points of an FX forward transaction (e.g., trade direction, currency pair, rate, settle date). The input data points are captured by circuitry 600 broadcasting and storing them in the blockchain (in the nodes 514a of the blockchain network 514) as an immutable record of type pending transaction 803. Other participant terminals can be used to view the transaction and elect whether they want to participate in the transaction or not. Once another participant enters their transaction details into a respective terminal to create the trade, the circuitry 600 adds their record to the blockchain as an immutable record of type accepted transaction 805. In Post-Trade, circuitry 600 will automatically recognize a confirmation on the blockchain via control logic 801 code once counterparties linked to the network agree on the transactional terms, and the circuitry 600 determines that predetermined guidelines have been met based on the coded logic of the control logic 801. For example, once another participant in the network elects to participate in a desired trade, they may agree to the data points provided by the counterparty. When the data points on both sides of the transaction match, the circuitry 600 will recognize and agree that the transaction is complete, record the entry into a currency forward contract between the counterparties, and record in the blockchain their authorized Entities C and D 510, 512 as a new immutable record of type executed transaction 807.

Integral with creating and valuating the currency forward contract, operations performed by the Entities C and D (510, 512) may include, S708, daily MTM collateral process in which leveraging the data provider feeds, the daily collateral cash movement can be automated via the circuitry 600. In this disclosure, an Entity C or D (510, 512) may be a Custodian, such as any bank that is participating in the blockchain network on behalf of their respective trading entities. The Entity C or D (510, 512) may be facilitated by a computer, a computer system, or virtual computer operated under the control of a bank. In S710, the final settlement process includes, if the assets can't be clearly committed on settlement date by a counterparty, the circuitry 600 will reverse any assets pledged as collateral and will ensure the integrity of the settlement process at both Entities C and D (510 and 512) via records stored on the distributed ledger.

In some embodiments, Data Provider feeds are periodically received from external sources and are integrated into the distributed ledger (in a node of the blockchain network 514) as real-time market updates for interest rates, pricing data, and currency forward point calculations. When the updates indicate changes in the markets, (primarily changes in prices that affect the valuation of the contract and/or the associated collateral), a change in valuation of the contract and/or a change in the associated collateral valuation may trigger one or more events. The control logic monitors and may perform actions based on the triggered events in order to enforce the guidelines and standards agreed upon. The circuitry 600 may be configured to perform valuation of the contract and associated collateral, detect one or more triggering events, and perform actions based on triggered events as multiple concurrent processes. In an exemplary aspect, the multiple concurrent processes are implemented as synchronous threads.

Figure 9:
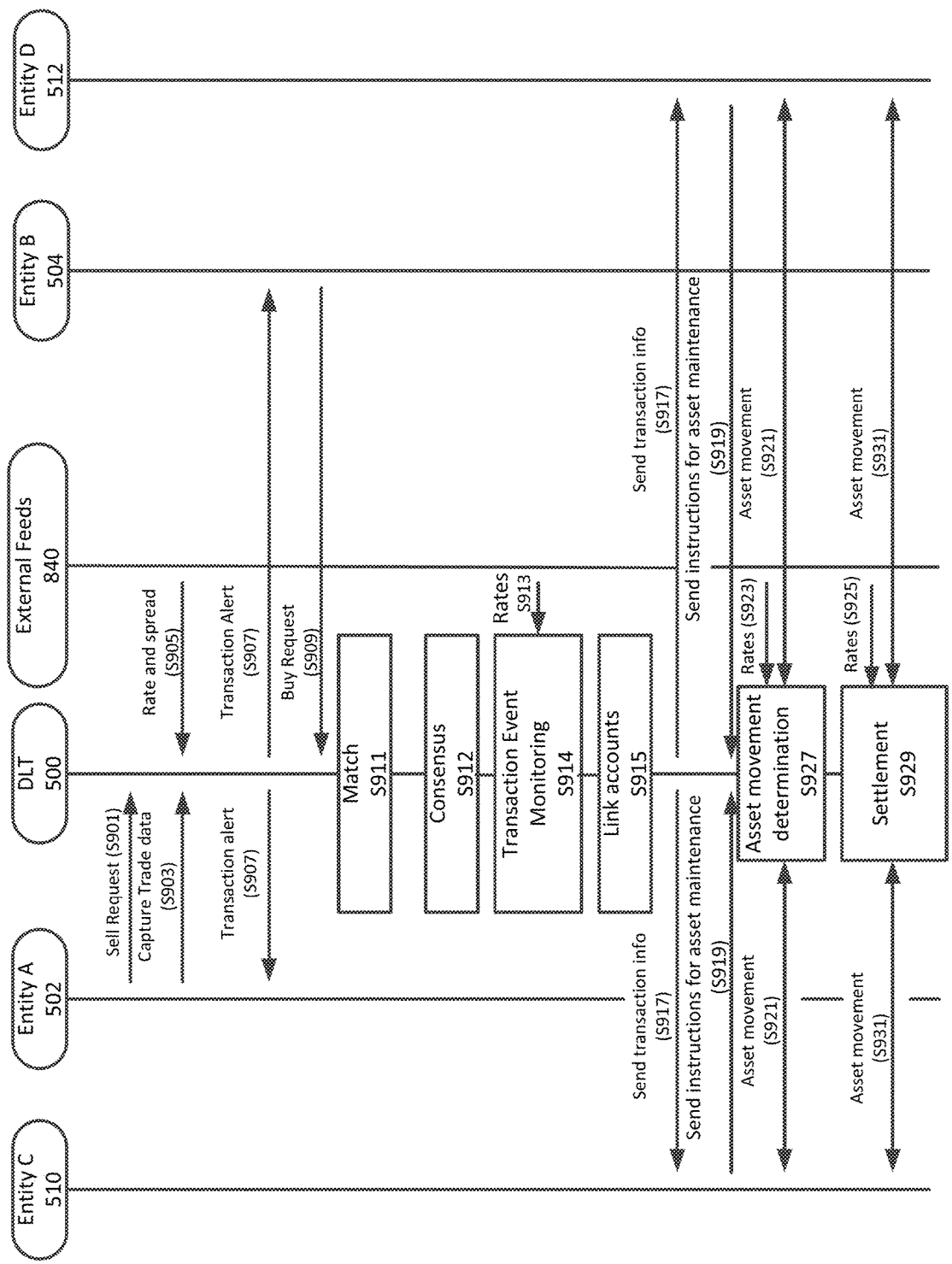
FIG. 9 is a sequence diagram for an example transaction using the distributed ledger technology, in accordance with exemplary aspects of the disclosure.

FIG. 9 is a sequence diagram for an example transaction using the distributed ledger technology, in accordance with exemplary aspects of the disclosure. In disclosed embodiments, as mentioned above blockchain system includes a network of nodes 514, where each node stores a full copy of the blockchain. In disclosed embodiments, the blockchain system may use a Proof-of-Work consensus algorithm. However, the structure and implementation of the blockchain system is not limited to a Proof-of-Work consensus algorithm. For example, the consensus may be performed using Proof-of-Stake. The first block of the blockchain is control logic 801, such as a smart contract, such as that shown in FIG. 8. The control logic 801 contains data and computer program logic. As a transaction is initiated, blockchain processing will broadcast the new transaction to all other nodes, a consensus algorithm will be performed for the transaction, and when a consensus is achieved, a block listing the transaction will be linked to the distributed ledger in a secure manner. In some embodiments, more than one transaction may be listed in a block. All nodes are notified of the updated distributed ledger. In some embodiments, each node may be any of several types of stand-alone computers, such as desktop computers, workstations, smartphones, tablet computers, to name a few, each of which has a connection to the Internet. Also, an entity that wishes to participate in the DLT 500 will be required to set up an account in order to be granted access to the blockchain network. Account information may include as a minimum, but not limited to, a username, a password or some type of authentication method, and an account identification. In some embodiments, the account information may include identification for a particular computer and an Internet address, each of which may be obtained automatically after a user is granted permission.

Regarding the example in FIG. 9, in S901, a Entity A 502 (via a computer terminal) may send a request to sell USD/CAD as a 30 day FX forward deliverable contract. In S903, the Entity A 502 enters trade data points in a trading user interface of a terminal. Using external data feeds 840, in S905, the circuitry 600 of a node obtains a rate to transact on in addition to a spread, which typically would be provided by a dealer. The circuitry 600 captures data points on a distributed ledger, for example the data points are stored in the control logic 801 and, in S907, all participants 502, 504 are sent an alert message that the transaction was generated. Entity B 504 wishes to engage in this trade, and, in S909, submits (via a computer terminal) a request to buy USD/CAD as a 30 day FX forward deliverable. In S911, the circuitry 600 of the DLT 500 performs an operation to check if both sides of the transaction match. In S912, the circuitry 600 performs an operation that determines that consensus is achieved and that the transaction is acknowledged and finalized on the distributed ledger. In S913, using External Feeds 840, updated rates, spreads, and prices that may affect valuation are received, and in S914, the circuitry 600 performs transaction event monitoring, which may include comparing the updated rates, spreads, and prices to predetermined thresholds in the control logic 801 to obtain a comparison result, and performing an action based on the comparison result. Actions may include performing an updated valuation of the contract, or sending an alert message. In S915, the circuitry 600 performs an operation to link each entity's respective custodian account to the transaction and ledger, and, in S917, the circuitry 600 sends transaction information related to an asset to the respective entity 510, 512. Each entity 510, 512 (via a computer terminal) may accept, and, in S919, send instructions related to ongoing asset maintenance in accordance with control logic executed by the circuitry 600 that implements ISDA and CSA agreements in place between the two entities. In S927, the circuitry 600 automatically determines ongoing asset movement. In S921, asset movement is carried out automatically according to the details of the CSA as implemented on the blockchain and updated rates S923. In S929, the circuitry 600 will conduct final settlement including in S931, the circuitry 600 will perform automated closing out of the final valuation movement calculation net of any residual asset balances held by each of the entities A and B, 502, 504 between their two respective entities C and D, 510, 512. In this settlement process, in S925, the circuitry 600 may continue to periodically receive current rates and use them in final valuations.

The distributed ledger technology of disclosed embodiments provides a substantial technological improvement by securely and efficiently controlling and recording all transactions and related asset valuation and movements in real time. For example, the incorporation of distributed ledgers for currency forward contracts eliminates the possibility of mismatches, errors, and unauthorized trades. Once executed on the ledger, forward transactions will constitute a binding obligation on both parties to the transaction. Using the DLT infrastructure, the entire step of Trade Execution and Capture is effectively merged into the Pre-Trade stage. Also, the distributed ledger technology of disclosed embodiments coordinates valuation of the contract and associated assets, for example as collateral. When one or more events are activated by changes in the markets, (primarily changes in prices that affect the valuation of the contract and/or the associated collateral), or by a participant, the circuitry 600 monitors and enforces the guidelines and standards agreed upon as contained in the control logic. In some embodiments, the circuitry 600 may be configured to perform valuation of the contract and associated assets, detect one or more triggering events, and perform actions based on triggered events as multiple concurrent processes. The distributed ledger technology eliminates the need for manual reconciliation and monitoring by each of the associated parties and reduces the frequency of manual interventions. Subsequent contracts between the same two counterparties need only consist of negotiating the economic terms of a new contract, and attaching that new contract to the previously recorded governing agreements recorded on the blockchain.

Moreover, the control logic 801 of the distributed ledger technology coordinates two disparate systems to seamlessly operate the systems concurrently. In particular, the distributed ledger technology further integrates disparate systems including a system for performing asset-linked contract transactions with a system for asset valuation and management, which brings about substantial improvements. By storing critical inputs as blocks in a distributed ledger by the control logic, computer systems may seamlessly move assets between counterparties automatically based on preset triggering events linked to valuation thresholds embedded in computer code secured on the blockchain itself. Further, settlement risk is addressed as part of the Valuation and Asset Movement stage. Thus, integration of the expiration of the term of the contract that is determined by the contract transaction system with asset valuation and management, enables the residual amount necessary to settle to be simply determined as the shift in valuation of the contract between the most recent valuation and asset movement point, plus any residual that was under the minimum transfer amount threshold.

Further, the circuitry 600 of a node may automatically perform the confirmation step during the contract setup stage as an integral part of the recording of trades on the ledger, thus eliminating a need for a separate confirmation stage.

Figure 10:
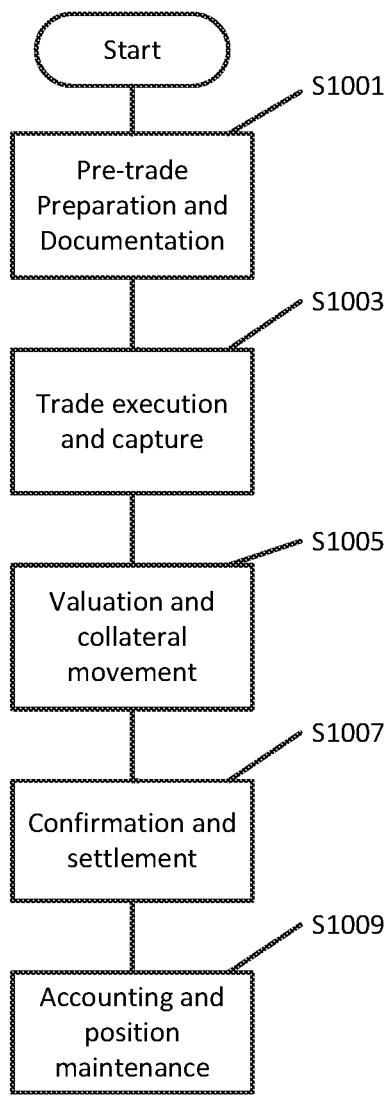
FIG. 10 is a flowchart for construction and execution in an exemplary application of the distributed ledger technology, in accordance with exemplary aspects of the disclosure.

FIG. 10 is a flowchart for construction and execution of a foreign exchange forward contract in the DLT 500, in accordance with exemplary aspects of the disclosure. The steps may involve four associated participants to each currency forward contract. In some embodiments, participants may be organizations. The DLT 500 includes a network of nodes that communicate using the Internet protocol. The steps performed by the circuitry 600 for the DLT 500 include (S1001) pre-trade preparation and documentation, (S1003) trade execution and capture, (S1005) valuation and collateral movement, (S1007) confirmation and settlement, and (S1009) accounting and position maintenance. It is noted that although the flowchart is shown as a sequence of steps, the steps may be performed in different orders and some steps may be performed concurrently. For example, the circuitry 600 may perform trade execution and capture S1003 concurrently with valuation and collateral movement S1005.

Pre-Trade Preparation and Documentation

Figure 11:
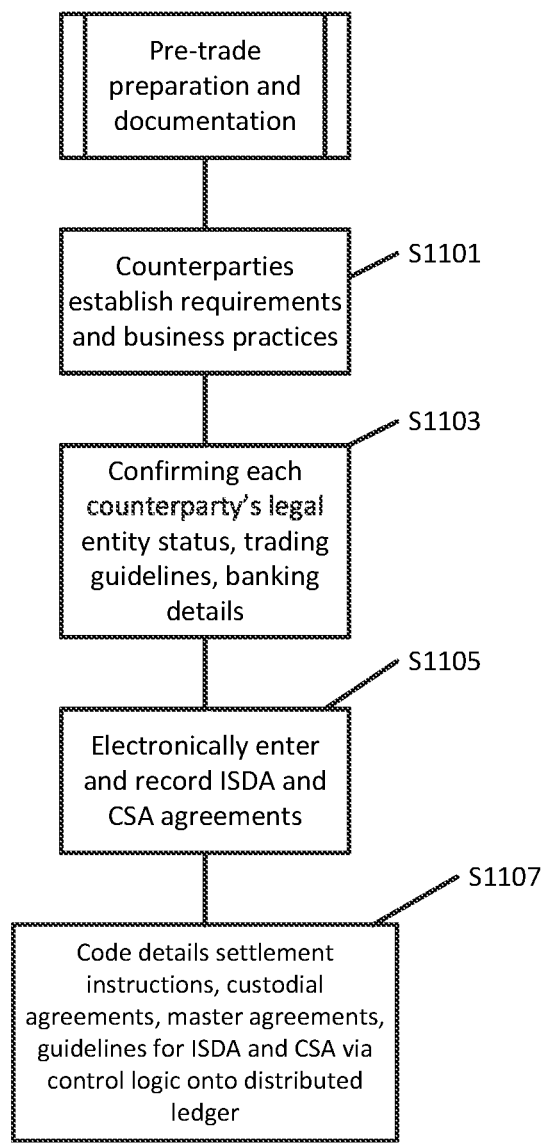
FIG. 11 is a flowchart for the pre-trade preparation and documentation process in the exemplary application, in accordance with exemplary aspects of the disclosure.

FIG. 11 is a flowchart for the pre-trade preparation and documentation process which initiates the business relationship between the two trading entities, or counterparties 502, 504. During this stage, in S1101, both counterparties' requirements and business practices are established, via respective computer terminals. In S1103, the circuitry 600 records a confirmation of each counterparty's legal entity status, trading guidelines, banking details, and, in S1105, records ISDA and CSA agreements. In S1107, a node 514*a* is used to code details of settlement instructions, custodial agreements, master agreements, and guidelines for ISDA and CSA's via a smart contract 801 onto the blockchain. This process may be performed in accordance with ISDA standards that standardize and formalize the agreements to enable smart contract implementation. See ISDA, "Smart Contracts and Distributed Ledger—A Legal Perspective", in isda.org, August, 2017, incorporated herein by reference in its entirety. In some embodiments, the circuitry 600 may extract portions of the ISDA and CSA, leaving the actual legal contract intact (with physically executed agreements stored as PDF files on the blockchain network). In some embodiments, the execution of the agreements may also be digitized by the circuitry 600 and included on the blockchain network and stored in the digitized contracts with their associated trade(s).

Digitizing the governing agreements can accelerate the initial documentation process and may grant firms cost savings as a result of the reduction of resources needed to produce and monitor the entire lifecycle of each forward contract for each counterparty they trade with. Economic terms for the contract may still be negotiated directly between counterparties for each trade, but the final terms can be recorded digitally on the copy of the blockchain in each node 514*a* and systematically checked and encoded by each counterparty through their own copy of the blockchain on the blockchain network 514. In this way, entering the terms of the forward contract by each entity automatically initiates the execution, confirmation, and recording steps of the process. When one or more events are triggered by changes in the markets, (primarily changes in prices that affect the valuation of the contract and/or the associated collateral), or by a participant, the circuitry 600 is configured to monitor and act as a digital enforcer of the guidelines and standards agreed upon as multiple concurrent processes. In some embodiments, the oracle 506 may handle receipt of market change data and creation of an event for processing by the control logic 801. This eliminates the need for manual reconciliation and monitoring by each of the associated parties and reduces the frequency of manual interventions. Subsequent contracts between the same two counterparties need only consist of negotiating the economic terms of a new contract, and attaching that new contract to the previously recorded governing agreements recorded on the blockchain.

Trade Execution and Capture

Figures 12, 13:
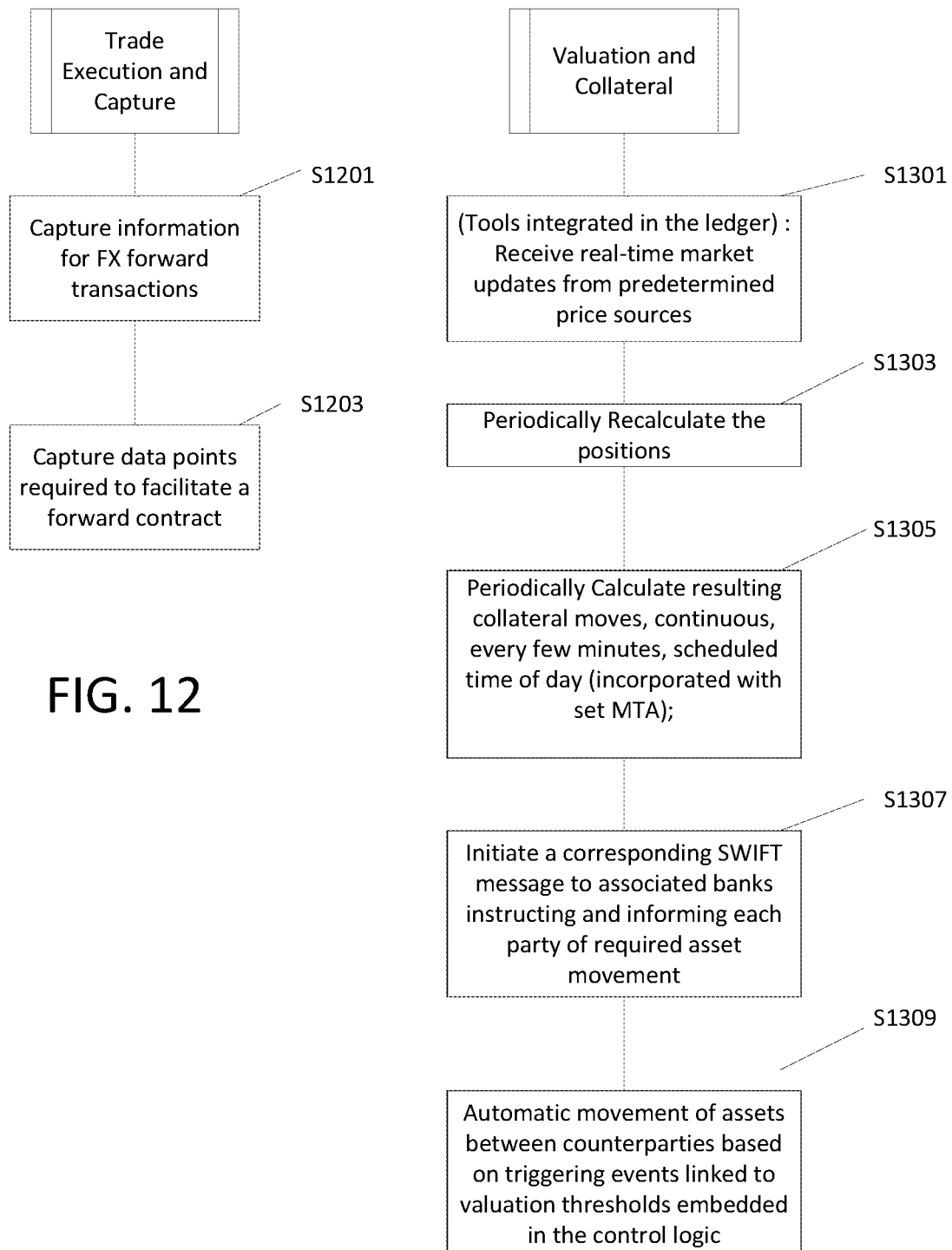
FIG. 12 is a flowchart for the trade execution and capture process in the exemplary application, in accordance with exemplary aspects of the disclosure.
FIG. 13 is a flowchart for the valuation calculations and collateral movement process in the exemplary application, in accordance with exemplary aspects of the disclosure.

FIG. 12 is a flowchart for the trade execution and capture function of the processing flow for FX forward transactions. In some embodiments, trade execution and capture may be performed by the circuitry 600 of at least one node 514*a*. In S1201, the circuitry 600 captures information for FX forward transactions including currency pair, trade date, spot rate and forward points, time of execution, expiry (settlement) date, counterparty, and notional amount transacted. In S1203, data from the captured information will be extracted by the circuitry 600 as data points required to facilitate a forward contract and will be added to the blockchain. The blockchain acts as an immutable digital audit trail for all information required by trade execution details. Receiving the data points constitutes initiation of a transaction, such as pending transaction 803, transaction acceptance 805, and executed transaction 807 in FIG. 7. The DLT 500 will broadcast a consensus request message for creating a data block listing this transaction and arrange the received information into a data block that is added to the blockchain when consensus is achieved, for example, by receiving a consensus message. The DLT 500 will broadcast the update to the blockchain to add the data block.

In particular, an initiating entity 502, via a computer terminal, may enter a transaction (i.e., the pending transaction record 803) which is encoded in a block. Next, the counterparty 504 (i.e., the other side of the trade) may enter a transaction acceptance record 805 which is again encoded in a block, and finally the circuitry 600 reads in the pending 803 and acceptance 805 records to create an executed transaction record 807 that is also recorded in a block. The pending and acceptance transactions are initiated by participants (trading counterparties) and the executed transaction record 807 is initiated by control logic 801 on the network that ensures the rules for executing a trade are satisfied (the executed control logic 801 matches pending and acceptance records based on matching transaction details recording in each record).

The incorporation of distributed ledgers for currency forward contracts eliminates the possibility of mismatches, errors, and unauthorized trades. Once executed on the ledger, forward transactions will constitute a binding obligation on both parties to the transaction. Using the DLT 500, the entire step of Trade Execution and Capture is effectively merged into the Pre-Trade stage described above.

Valuation and Collateral Movement

FIG. 13 is a flowchart for the valuation calculations and collateral movement methods for forward contracts which can be implemented via circuitry 600 as a node of the blockchain network 514. Events, such as receiving price data feeds, may be handled by the oracle 506. In particular, valuation processes and data provider feeds can be posted into the blockchain to, in S1301, receive real-time market updates from previously agreed-upon pricing sources. The circuitry 600 periodically performs valuation and collateral instruction processes, including, in S1303, recalculating the positions, and, in S1305, calculating appropriate collateral moves based on valuation calculation results of S1303. Minimum transfer amounts (MTA) can be incorporated into the collateral calculation process on the control logic 801. In some embodiments, collateral valuation and movement may be characterized as three phases: (1) exposure valuation, (2) collateral valuation, and (3) collateral movement. During exposure valuation, within the scope of the trade and valuation date of a financial transaction stored on the blockchain, and based on the legal documentation that governs the financial transaction (valuation times), which is also stored on the blockchain, the oracle 506 uses data from the financial transaction to obtain feeds of current FX rates from outside data sources. For example, a feed could provide EUR/USD spot rate and various standard tenor EUR/USD Forward points at valuation time based on data pulled by the circuitry 600 based on the control logic 801.

In S1303, the circuitry 600 may perform linear interpolation to calculate the rate between two known variables (e.g., current point in time, future data in time) based on the days remaining in the financial transaction (e.g. a 30 day forward rate provided can be interpolated down to a 15 day rate). A Market to Market Matrix of currency pairs are used by the circuitry 600 to calculate the valuation of the base currency and settle currency. This step clarifies which currency is converted via the exchange rate into the other currency (e.g. EUR/USD converts given EUR exposure into equivalent USD exposure). The circuitry compares current valuation with the original transaction data agreed upon on the trade date to determine the profit or loss of the transaction at this point in time. This step establishes the economic exposure to the counterparty due to price movement in the markets over time. For example, a 1000 EUR/USD contract where the exchange rate moves higher by 1% would create a 10 EUR exposure increase. The debtor and creditor are determined based upon who the initiator and counterparty are to the transaction. For example, a positive exposure indicates the EUR holder would have to deliver collateral to cover the increase EUR exposure.

During collateral valuation, within the scope of the trade and valuation date of the financial transaction stored on the blockchain, and based on the legal documentation that governs the financial transaction (valuation times), which is also stored on the blockchain, data from the current pledged collateral is used by the circuitry 600 to obtain feeds of current market process from the agreed upon data sources. If US 2-year treasuries are posted as collateral, then the pricing source would feed updated Treasuries process to the network.

In S1303, the circuitry 600 may calculate the total Collateral Valuation with agreed upon data sources. For example, if US 2-Treasuries were posted as collateral in the original amount of $100 and the valuation of the securities decreased by 1% then the updated valuation would reflect the decrease in collateral coverage of 1%. The total Collateral Valuation would be updated and recorded as $99.

During collateral movement, in S1305, the circuitry 600 calculates the Collateral Calculation value as the current Exposure Valuation minus the Collateral Valuation and stores the result in the blockchain. If the absolute value of the Collateral Calculation is less than the Minimum Transfer Amount stored in the legal documentation on the digital ledger, the event is stored on the blockchain, For example, if the MTA was $1 and the Collateral Calculation value is less than $1, the record is stored and no further action would be necessary. If the absolute value of the Collateral Calculation value is greater than the Minimum Transfer Amount stored in the legal documentation on the blockchain, a Movement Amount is created. For example, if the MTA was $1 and the Collateral Calculation value is $2, the Movement Amount of $2 stored and movement proceeds.

In S1307, the circuitry 600 either initiates a corresponding SWIFT message, or similar transmission (via Application Programming Interface (API)) to the associated bank's computer system instructing and informing each entity of required collateral movement, or generates a corresponding transaction directly to the distributed ledger where banks may be directly connecting into the blockchain network 514 via their own node(s).

Incorporating these inputs into a distributed ledger enables bank computer systems to, in S1309, seamlessly move collateral between counterparties automatically based on preset triggering events linked to valuation thresholds embedded in control logic 801 secured on the blockchain itself. In some embodiments, participant banks not directly linked into the network via their own node(s) may receive the blockchain generated SWIFT message, or other standard financial transmission message formats similarly to other messages received from traditional sources. This automation stage provides the linkage that is core to the CLCF instrument.

In some embodiments, based on the legal documentation that governs the financial transaction, the circuitry 600 determines the type of financial instrument to use as collateral. For example, 2-Year Treasuries may be selected as eligible collateral. Fund level banking information stored on the digital ledger that is linked to the transaction is used to generate a financial message to the custodian to debit collateral. For example, a message to move $2 of 2-Year Treasuries may be generated. Once the financial message is received at the custodian (bank) an acknowledgement is sent by the bank computer system back to the blockchain network that it has been received. Once collateral has been received by the credited custodian, a message is sent by the credited entity's computer system back to the blockchain network that the collateral movement has been completed. The updated collateral balances are recorded to the blockchain in a linked data block.

Confirmation and Settlement

Figures 14, 15:
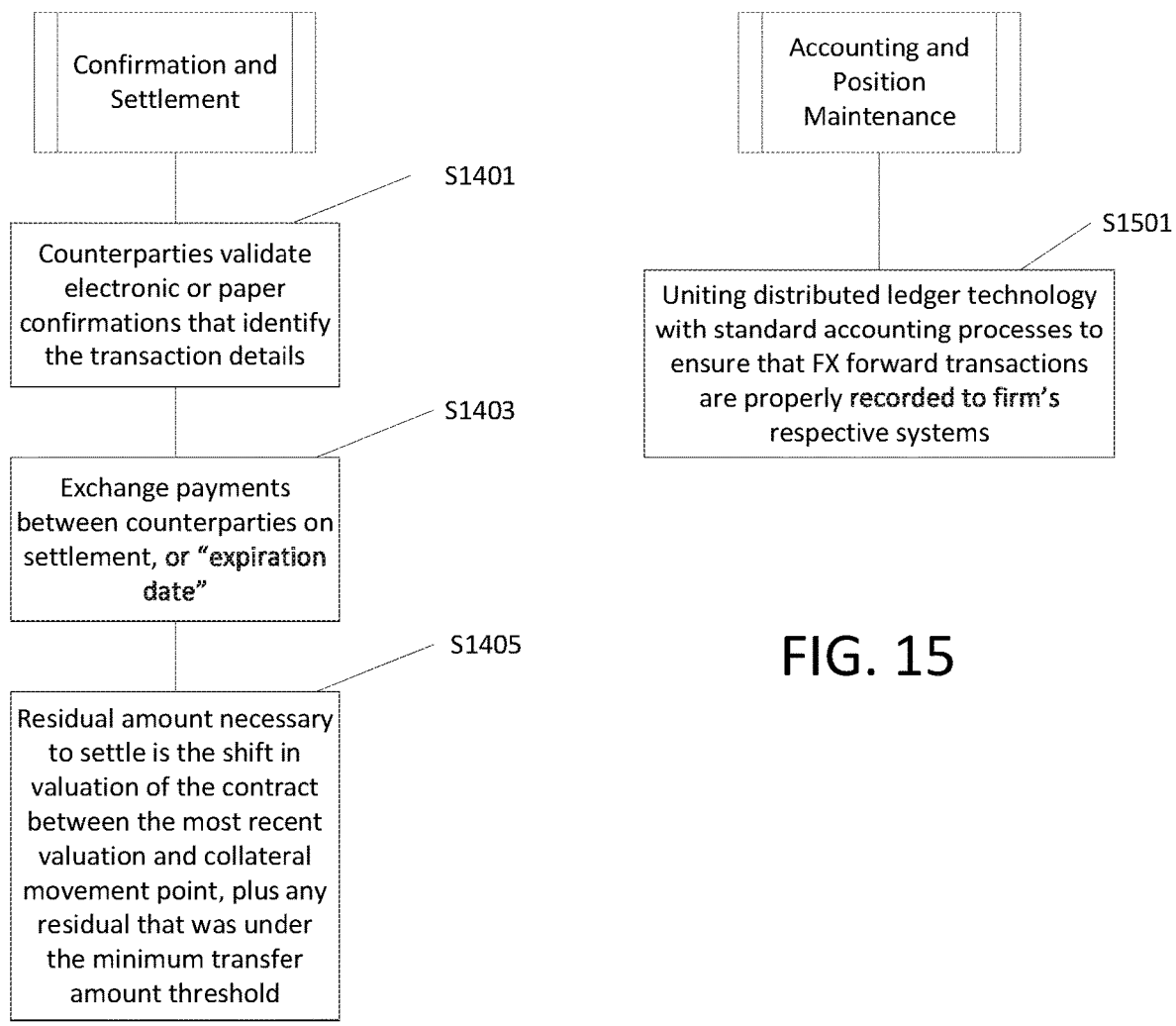
FIG. 14 is a flowchart for the confirmation and settlement stage in the exemplary application, in accordance with exemplary aspects of the disclosure.
FIG. 15 is a flowchart of the accounting and position management process in the exemplary application, in accordance with exemplary aspects of the disclosure.

FIG. 14 is a flowchart for the confirmation and settlement stage. The transaction confirmation is a double-check of the terms of an FX forward transaction. As a result, appropriate management of the confirmation process is a vital control. During the confirmation stage, in S1401, counterparties via respective terminals validate electronic or paper confirmations that identify the transaction details and provide other relevant information. This is the last step before the transaction is considered finally executed. In some embodiments, the confirmation step may be completely performed by the circuitry 600 during the FX contract setup phase, and performed as an integral part of recording trades on the distributed ledger, thus a separate stage of the process is not needed with DLT.

In S1403, payments are exchanged between trading entities 502, 504 via respective computer terminals on final settlement, or expiration date. Settlement risk is the risk that one entity in a forward transaction fails to deliver payment to its counterparty, resulting in the loss of the economic value of the transaction. As mentioned above, settlement risk is addressed as part of the Valuation and Collateral Movement stage. At expiration, in S1405, the circuitry 600 determines the residual amount necessary to settle as the shift in valuation of the contract between the most recent valuation and collateral movement point, plus any residual that was under the minimum transfer amount threshold.

In effect, the automation of collateral movement behaves similar to an ongoing or nearly continuous settlement process. In some cases, like for tri-party collateral arrangements needed for US Mutual Funds, final settlement may differ only in that money may be transferred between counterparties as well as to clear out the tri-party collateral account balance associated with the contract that is expiring.

Accounting and Position Maintenance

FIG. 15 is a flowchart of the accounting and position maintenance stage. In S1501, uniting distributed ledger technology with current state accounting processes ensures that FX forward transactions are properly recorded to firms' respective systems and instantaneously logged following final settlement. A DLT platform may include safeguards that will prevent any modifications to the original posted transactions and any subsequent updates to the blockchain for each contract. The immutable nature of the blockchain ensures trust is maintained through the encryption and automation features: records cannot be edited or deleted, and stored code (smart contracts) cannot be altered. New records and new smart contracts can only be executed with the consent of both counterparties for each contract. This mechanism, coupled with the network only being accessible to trusted participants, safeguards the legitimacy of accounting source data maintained based on transactions stored on the blockchain network.

Numerous modifications and variations of the present invention are possible in light of the above teachings. It is therefore to be understood that within the scope of the appended claims, the invention may be practiced otherwise than as specifically described herein.

Transforming the market structure for currency forward contracts provides the potential to essentially eliminate counterparty exposure by linking the collateral protection to variations in economic exposure as they occur. It also provides the potential to make the market operate more efficiently by linking together the core market participants (typically four entities are involved with every contract) with a trusted, shared source of truth for each contract, while still retaining the benefits of the OTC market structure itself. OTC markets allow valuable customization and enable innovation amongst market participants. Well-structured OTC markets also provide the potential to avoid highly concentrated exposures to the failure of any single market participant. While each participant would enjoy the benefits of a streamlined and automated process for managing the lifecycle of each contract, the primary benefit is to the market as a whole due to the nearly complete elimination of counterparty risk. Especially for large trades, opening the market up to more counterparties and new counterparties should result in lower cost and lower risk for all market participants on all trades. Automating the valuation and collateral movement processes simplifies the market operation, and makes portfolio and position management decisions more accurate. Shifting the market structure from manual, disconnected infrastructure to automated, interconnected processes can reduce costs, reduce risks, increase trust, increase liquidity, and introduce entirely new possibilities into the capital markets as a whole.

As mentioned above, the distributed ledger technology that coordinates the creation and valuation of contracts for currency forwards with collateral valuation and management is applicable as well to other types of trades that involve collateral. Securities lending markets operate to fulfill demands for borrowing securities for a variety of purposes from owners of securities. Examples of securities lending include borrowing to support short transactions, whereby securities are sold with an expectation of price declines than if repurchased later at a future price. When the security is sold short, the seller must find a security to borrow and sell in order to settle the transaction. The borrower generally pays a lending fee during the period of the loan to the lender. At any time, the lender can demand the loan be recalled, at which point the securities must be returned by the borrower and the loan is terminated. Other examples are related to the demand for securing specific holdings for a variety of other purposes for a short period of time, including market maker sell coverage, settlement protection for sellers whose trades are for some reason failing to settle, collateral transformation or exchange, delivering securities on loan back to the lender, and a variety of arbitrage trading strategies such as index arbitrage or share class arbitrage.

Currently, a securities lending transaction involves a variety of parties, from the borrower, their broker or a prime broker, a securities lending agent or direct lender, and the beneficial owners. The number of parties involved, the need to ensure rapid recall of securities out on loan, and the delayed pace of handling collateral (similar to that described in the forward contract process in FIG. 4) all expose the securities lending markets to inefficiency and uncompensated risk. In each case, regardless of the reason for the loan, an amount of collateral is agreed upon with appropriate adjustments in collateral coverage amounts based on the type of collateral and the potential valuation volatility during the period of the loan. A typical cash collateral securities loan agreement would require 102% coverage of cash collateral versus the value of the securities borrowed. Another example would require 105% coverage of equities collateral versus the value of the securities borrowed, due to higher volatility in both the securities borrowed and the securities provided as collateral. Subsequently, there is a lag in the delivery of collateral and the systems involved in the lending and the collateral movement processes are not integrated.

The disclosed DLT may be applied to securities lending by integrating the creation of collateral-linked contracts for securities loans and collateral valuation and movement.

Currently, Exchange Traded Fund (ETF) shares traded on exchange in the secondary market are created and redeemed in the primary market directly with ETF fund managers. The process of creating and redeeming ETF share is handled in bulk, through the trading of baskets of ETF shares. When the market sees a need to increase (create) or decrease (redeem) the supply of ETF shares available for trading, shares are issued or redeemed in blocks of 50,000-250,000 or more, depending on the fund.

Creating a basket of shares to trade typically involves a two day delay in settlement, but in the period of time between the initiation of the order to create the basket, and settlement 2 days later, the fund manager and the purchaser both are making trade commitments to ensure the basket is settled. Collateral is posted by the purchaser to protect the ETF Manager from a failure of the purchaser to deliver assets at settlement. Similarly, redeeming a basket involves risk of settlement failure that is protected against by posting collateral. Similar to securities lending, collateral coverage is adjusted based on the valuation volatility of both the basket and the underlying collateral, but there is a lag in the delivery of collateral and the systems involved in the creation/redemption and the collateral movement processes are not integrated.

The disclosed DLT may be applied to Exchange Traded Fund trading by integrating the creation of collateral-linked contracts for ETF basket creation and collateral valuation and movement.

The above disclosure also encompasses the embodiments listed below.

(1) A device in a blockchain network that communicates over a computer network with a first external computer terminal, one or more second external computer terminals, and at least two external entities. The device includes a memory configured to maintain data of an electronic transaction, predetermined thresholds, and external identification information; and circuitry configured to add at least one transaction block to a chained sequence of one or more blocks, including receive, over the computer network from the first external computer terminal, a request message having the data of the electronic transaction, broadcast, over the computer network to the one or more second external computer terminals, an alert message alerting of the request message, receive, over the computer network from the one of the one or more second external computer terminals, a response message having counter transaction data that relates to the alert message, determine a match between the transaction data and the counter transaction data, broadcast, to a plurality of nodes in the blockchain network, a consensus request message for generating the at least one transaction block as an immutable record of the transaction data and the counter transaction data, the generating the at least one transaction block includes creating a block header that contains a hash pointer that has a hash of a block header of a block that the at least one transaction block is linked to, receive, from one of the plurality of nodes, a message indicating that consensus has been achieved, and add the at least one transaction block to the chained sequence, update the data of the electronic transaction and compare the data to the predetermined thresholds to obtain a comparison result, and perform an action based on the comparison result; and concurrently with the update, compare and perform an action, perform periodic valuation and transmission of an item having value that is tied to the transaction data, including transmit messages to external entities associated with the external identification information, establish transmission links with the external entities, determine a value of the item, and establish movement of the item between the external entities based on the determined value of the item and the predetermined thresholds.

(2) The device of feature (1), in which the transaction data and the counter transaction data includes a value at a future date and an initial posting of the value of the item, the circuitry further configured to determine a value of the item after the initial posting, and establish movement of the item between the external entities based on a final value of the item.

(3) The device of features (1) or (2), in which the circuitry is further configured to move the item directly between the external entities based on the external identification information.

(4) The device of any of features (1) to (3), in which the item is an asset in the transaction data and in the counter transaction data, respectively. The predetermined thresholds include a minimum and a maximum threshold. The circuitry is further configured to receive periodic feeds of updated data of the electronic transaction, perform valuation of the asset based on the updated data and compare the valuation values with the predetermined thresholds, and establish movement of the item between the external entities based on the external identification information in accordance with the comparison.

(5) The device of any of features (1) to (4), in which a block of the immutable record includes confirmation instructions, and the circuitry is further configured to generate a block having an executed transaction.

(6) The device of any of features (1) to (5), in which the transaction data and the counter transaction data include a future settlement date. The circuitry is further configured to settle the movement of the item on the future settlement date.

(7) The device of any of features (1) to (6), in which the transaction data and the counter transaction data include a currency pair and a forward exchange rate. The circuitry is further configured to broadcast a consensus request message for creating a data block as an immutable record of the currency pair and the forward exchange rate.

(8) The device of any of features (1) to (7), in which the movement of the asset is settled, via the circuitry, by determining a shift in valuation between a last valuation and an asset movement point, plus a residual amount that is under the minimum threshold.

(9) The device of any of features (1) to (8), in which the memory is further configured to maintain one or more documents that are uploaded and stored in a data block as an HTML template including variable names of terms that can be changed based on a state of control logic. The circuitry is further configured to read the template from the block as a starting point reference to begin a process of establishing documents governing transactions, receive, over the computer network from the first external computer terminal, a message having updated terms data, broadcast, over the computer network to one or more second external computer terminals, an alert message alerting of the request message, receive, over the computer network from one of the one or more second external computer terminals, a response message having counter terms data that relates to the alert message, determine a match between the terms data and the counter terms data, broadcast, to plurality of nodes in the blockchain network, a consensus request message for creating a data block as an immutable record of the terms data and the counter terms data, and receive, from one of the plurality of nodes, a message indicating that consensus has been achieved.

(10) A method for a device in a blockchain network that communicates over a computer network with a first external computer terminal, one or more second external computer terminals, and at least two external entities. The device comprising a memory configured to maintain data of an electronic transaction, predetermined thresholds, and external identification information, and circuitry. The method includes adding, by the circuitry, at least one transaction block to a chained sequence of one or more blocks, including receiving, over the computer network from the first external computer terminal, a request message having the data of the electronic transaction, broadcasting, over the computer network to the one or more second external computer terminals, an alert message alerting of the request message, receiving, over the computer network from the one of the one or more second external computer terminals, a response message having counter transaction data that relates to the alert message, determining a match between the transaction data and the counter transaction data, broadcasting, to a plurality of nodes in the blockchain network, a consensus request message for generating the at least one transaction block as an immutable record of the transaction data and the counter transaction data, the generating the at least one transaction block includes creating a block header that contains a hash pointer that has a hash of a block header of a block that the at least one transaction block is linked to, receiving, from one of the plurality of nodes, a message indicating that consensus has been achieved, and adding the at least one transaction block to the chained sequence, updating the data of the electronic transaction and comparing the data to the predetermined thresholds to obtain a comparison result, and performing an action based on the comparison result; and concurrently with the updating, comparing and performing an action, performing, by the circuitry, periodic valuation and transmission of an item having value that is tied to the transaction data, including transmitting messages to external entities associated with the external identification information, establishing transmission links with the external entities, determining a value of the item, and establishing movement of the item between the external entities based on the determined value of the item and the predetermined thresholds.

(11) The method of feature (10), in which the transaction data and the counter transaction data includes a value at a future date and an initial posting of the value of the item, the method further including determining, by the circuitry, a value of the item after the initial posting; and establishing movement, by the circuitry, of the item between the external entities based on a final value of the item.

(12) The method of features (10) or (11), further including moving the item directly between the external entities based on the external identification information.

(13) The method of any of features (10) to (12), in which the item is an asset in the transaction data and in the counter transaction data, respectively. The predetermined thresholds include a minimum and a maximum threshold. The method further includes receiving periodic feeds of updated data of the electronic transaction; performing valuation of the asset based on the updated data and compare the valuation values with the predetermined thresholds; and establishing movement of the item between the external entities based on the external identification information in accordance with the comparison.

(14) The method of any of features (10) to (13), in which a block of the immutable record includes confirmation instructions, the method further includes generating a block having an executed transaction.

(15) The method of any of features (11) to (14), in which the transaction data and the counter transaction data include a future settlement date. The method further includes settling the movement of the item on the future settlement date.

(16) The method of any of features (10) to (15), in which the transaction data and the counter transaction data include a currency pair and a forward exchange rate. The method further includes broadcasting a consensus request message for creating a data block as an immutable record of the currency pair and the forward exchange rate.

(17) The method of any of features (10) to (16), in which the settling of the movement of the asset by determining a shift in valuation between a last valuation and an asset movement point, plus a residual amount that is under the minimum threshold.

(18) The method of any of features (10) to (17), in which the memory is further configured to maintain one or more documents that are uploaded and stored in a data block as an HTML template including variable names of terms that can be changed based on a state of control logic. The method further includes reading the template from the block as a starting point reference to begin a process of establishing documents governing transactions; receiving, over the computer network from the first external computer terminal, a message having updated terms data; broadcasting, over the computer network to the one or more second external computer terminals, an alert message alerting of the request message; receiving, over the computer network from the one of the one or more second external computer terminals, a response message having counter terms data that relates to the alert message; determining, by the circuitry, a match between the terms data and the counter terms data; broadcasting, to the plurality of nodes in the blockchain network, a consensus request message for creating a data block as an immutable record of the terms data and the counter terms data; and receiving, from one of the plurality of nodes, a message indicating that consensus has been achieved.

(19) A non-transitory computer-readable storage medium including computer executable instructions, in which the instructions, when executed by a computer, cause the computer to perform a method. The method includes adding at least one transaction block to a chained sequence of one or more blocks, including receiving, over a computer network from a first external computer terminal, a request message having the data of the electronic transaction, broadcasting, over the computer network to one or more second external computer terminals, an alert message alerting of the request message, receiving, over the computer network from one of the one or more second external computer terminals, a response message having counter transaction data that relates to the alert message, determining a match between the transaction data and the counter transaction data, broadcasting, to a plurality of nodes in the blockchain network, a consensus request message for generating the at least one transaction block as an immutable record of the transaction data and the counter transaction data, the generating the at least one transaction block includes creating a block header that contains a hash pointer that has a hash of a block header of a block that the at least one transaction block is linked to, receiving, from one of the plurality of nodes, a message indicating that consensus has been achieved, and adding the at least one transaction block to the chained sequence, updating the data of the electronic transaction and comparing the data to the predetermined thresholds to obtain a comparison result, and performing an action based on the comparison result; concurrently with the updating, comparing and performing an action, performing periodic valuation and transmission of an item having value that is tied to the transaction data, including transmitting messages to external entities associated with the external identification information, establishing transmission links with the external entities, determining a value of the item, and establishing movement of the item between the external entities based on the determined value of the item and the predetermined thresholds.

(20) The device of any of features (1) to (9), in which the transaction data and counter transaction data includes an agreement having a value of securities on loan for a specified or unspecified period, and initially posting of collateral having a value as the value of the amount data, the circuitry further configured to determine a value of the collateral after initial posting, and settle the movement of the collateral based on a final value of the collateral in accordance with the agreement.

(21) The device of any of features (1) to (9), in which the transaction data and counter transaction data includes an agreement having a value of an Exchange Traded Fund (ETF) Basket creation of redemption trade, and initially posting of collateral having a value as the value of the amount data, the circuitry further configured to determine a value of the collateral after initial posting, and settle the movement of the collateral based on a final value of the collateral in accordance with the agreement.

The invention claimed is:

1. A device in a blockchain network that communicates over a computer network with a first external computer terminal, one or more second external computer terminals, and at least two external entities, the device comprising:

a memory configured to maintain data of an electronic transaction, predetermined thresholds, and external identification information; and circuitry configured to:

add at least one transaction block to a chained sequence of one or more blocks, including:

receive, over the computer network from the first external computer terminal, a request message having the data of the electronic transaction, broadcast, over the computer network to one or more second external computer terminals, an alert message alerting of the request message, receive, over the computer network from one of the one or more second external computer terminals, a response message having counter transaction data that relates to the alert message, determine a match between the transaction data and the counter transaction data, broadcast, to a plurality of nodes in the blockchain network, a consensus request message for generating the at least one transaction block as an immutable record of the transaction data and the counter transaction data, the generating the at least one transaction block includes creating a block header that contains a hash pointer that has a hash of a block header of a block that the at least one transaction block is linked to, receive, from one of the plurality of nodes, a message indicating that consensus has been achieved, and add the at least one transaction block to the chained sequence, update the data of the electronic transaction and compare the data, including at least one of an updated rate and spread related to valuation of an item having a value that is tied to the transaction data, to the predetermined thresholds to obtain a comparison result, wherein the transaction data and the counter transaction data include a value at a future settlement date, an initial posting of the value of the item, a currency pair and a forward exchange rate, determine the value of the item after the initial posting, establish movement of the item between the external entities based on a final value of the item, settle the movement of the item on the future settlement date, broadcast a consensus request message for creating a data block as an immutable record of the currency pair and the forward exchange rate, and perform an action based on the comparison result including performing an updated valuation of a contract and sending an alert message, and concurrently with the update, compare and perform an action, perform periodic valuation and transmission of the item having the value that is tied to the transaction data, including:

transmit messages to external entities associated with the external identification information, establish transmission links with the external entities including links between respective custodian accounts of the external entities with the transaction and a ledger, determine a value of the item, and establish movement of the item between the external entities based on the determined value of the item and the predetermined thresholds.

2. The device of claim 1, wherein the circuitry is further configured to move the item directly between the external entities based on the external identification information.

3. The device of claim 1, wherein a block of the immutable record includes confirmation instructions, and the circuitry is further configured to generate a block having an executed transaction.

4. The device of claim 1, wherein the memory is further configured to maintain one or more documents that are uploaded and stored in a data block as an HTML template including variable names of terms that can be changed based on a state of control logic, wherein the circuitry is further configured to read the template from the block as a starting point reference to begin a process of establishing documents governing transactions, receive, over the computer network from the first external computer terminal, a message having updated terms data, broadcast, over the computer network to one or more second external computer terminals, an alert message alerting of the request message, receive, over the computer network from one of the one or more second external computer terminals, a response message having counter terms data that relates to the alert message, determine a match between the terms data and the counter terms data, broadcast, to the plurality of nodes in the blockchain network, a consensus request message for creating a data block as an immutable record of the terms data and the counter terms data, and receive, from one of the plurality of nodes, a message indicating that consensus has been achieved.

5. The device of claim 1, wherein the item is an asset in the transaction data and in the counter transaction data, respectively, wherein the predetermined thresholds include a minimum and a maximum threshold, wherein the circuitry is further configured to receive periodic feeds of updated data of the electronic transaction, perform valuation of the asset based on the updated data and compare the valuation values with the predetermined thresholds, and establish movement of the item between the external entities based on the external identification information in accordance with the comparison.

6. The device of claim 5, wherein the movement of the asset is settled, via the circuitry, by determining a shift in valuation between a last valuation and an asset movement point, plus a residual amount that is under the minimum threshold.

7. A method for a device in a blockchain network that communicates over a computer network with a first external computer terminal, one or more second external computer terminals, and at least two external entities, the device comprising a memory configured to maintain data of an electronic transaction, predetermined thresholds, and external identification information, and circuitry, the method comprising:

adding, by the circuitry, at least one transaction block to a chained sequence of one or more blocks, including:

receiving, over the computer network from the first external computer terminal, a request message having the data of the electronic transaction, broadcasting, over the computer network to the one or more second external computer terminals, an alert message alerting of the request message, receiving, over the computer network from the one of the one or more second external computer terminals, a response message having counter transaction data that relates to the alert message, determining a match between the transaction data and the counter transaction data, broadcasting, to a plurality of nodes in the blockchain network, a consensus request message for generating the at least one transaction block as an immutable record of the transaction data and the counter transaction data, the generating the at least one transaction block includes creating a block header that contains a hash pointer that has a hash of a block header of a block that the at least one transaction block is linked to, receiving, from one of the plurality of nodes, a message indicating that consensus has been achieved, and adding the at least one transaction block to the chained sequence, updating the data of the electronic transaction and comparing the data, including at least one of an updated rate and spread related to valuation of an item having value that is tied to the transaction data, to the predetermined thresholds to obtain a comparison result, wherein the transaction data and the counter transaction data include a value at a future settlement date, an initial posting of the value of the item, a currency pair and a forward exchange rate, determining the value of the item after the initial posting, establishing movement of the item between the external entities based on a final value of the item, settling the movement of the item on the future settlement date, broadcasting a consensus request message for creating a data block as an immutable record of the currency pair and the forward exchange rate, and performing an action based on the comparison result including performing an updated valuation of a contract and sending an alert message; and concurrently with the updating, comparing and performing an action, performing, by the circuitry, periodic valuation and transmission of the item having the value that is tied to the transaction data, including:

transmitting messages to the external entities associated with the external identification information, establishing transmission links with the external entities including links between respective custodian accounts of the external entities with the transaction and a ledger, determining a value of the item, and establishing movement of the item between the external entities based on the determined value of the item and the predetermined thresholds.

8. The method of claim 7, further comprising: moving the item directly between the external entities based on the external identification information.

9. The method of claim 7, wherein a block of the immutable record includes confirmation instructions, the method further comprising:

generating a block having an executed transaction.

10. The method of claim 7, wherein the memory is further configured to maintain one or more documents that are uploaded and stored in a data block as an HTML template including variable names of terms that can be changed based on a state of control logic, wherein the method further comprises:

reading the template from the block as a starting point reference to begin a process of establishing documents governing transactions;

receiving, over the computer network from the first external computer terminal, a message having updated terms data;

broadcasting, over the computer network to one or more second external computer terminals, an alert message alerting of the request message;

receiving, over the computer network from one of the one or more second external computer terminals, a response message having counter terms data that relates to the alert message;

determining, by the circuitry, a match between the terms data and the counter terms data;

broadcasting, to the plurality of nodes in the blockchain network, a consensus request message for creating a data block as an immutable record of the terms data and the counter terms data; and receiving, from one of the plurality of nodes, a message indicating that consensus has been achieved.

11. The method of claim 7, wherein the item is an asset in the transaction data and in the counter transaction data, respectively, wherein the predetermined thresholds include a minimum and a maximum threshold, wherein the method further comprises:

receiving periodic feeds of updated data of the electronic transaction;

performing valuation of the asset based on the updated data and compare the valuation values with the predetermined thresholds; and establishing movement of the item between the external entities based on the external identification information in accordance with the comparison.

12. The method of claim 11, wherein the settling of the movement of the asset by determining a shift in valuation between a last valuation and an asset movement point, plus a residual amount that is under the minimum threshold.

13. A non-transitory computer-readable storage medium including computer executable instructions, wherein the instructions, when executed by a computer, cause the computer to perform a method, the method comprising:

adding at least one transaction block to a chained sequence of one or more blocks, including:

receiving, over a computer network from a first external computer terminal, a request message having the data of the electronic transaction, broadcasting, over the computer network to one or more second external computer terminals, an alert message alerting of the request message, receiving, over the computer network from the one of the one or more second external computer terminals, a response message having counter transaction data that relates to the alert message, determining a match between the transaction data and the counter transaction data, broadcasting, to a plurality of nodes in a blockchain network, a consensus request message for generating the at least one transaction block as an immutable record of the transaction data and the counter transaction data, the generating the at least one transaction block includes creating a block header that contains a hash pointer that has a hash of a block header of a block that the at least one transaction block is linked to, receiving, from one of the plurality of nodes, a message indicating that consensus has been achieved, and adding the at least one transaction block to the chained sequence, updating the data of the electronic transaction and comparing the data, including at least one of an updated rate and spread related to valuation of an item having value that is tied to the transaction data, to the predetermined thresholds to obtain a comparison result, wherein the transaction data and the counter transaction data include a value at a future settlement date, an initial posting of the value of the item, a currency pair and a forward exchange rate, determining the value of the item after the initial posting, establishing movement of the item between the external entities based on a final value of the item, settling the movement of the item on the future settlement date, broadcasting a consensus request message for creating a data block as an immutable record of the currency pair and the forward exchange rate, and performing an action based on the comparison result including performing an updated valuation of a contract and sending an alert message;

and concurrently with the updating, comparing and performing an action, performing periodic valuation and transmission of the item having the value that is tied to the transaction data, including:

transmitting messages to external entities associated with the external identification information, establishing transmission links with the external entities including links between respective custodian accounts of the external entities with the transaction and a ledger, determining a value of the item, and establishing movement of the item between the external entities based on the determined value of the item and the predetermined thresholds.

* * * * *